US012763085B2

(12) United States Patent
Herre et al.

(10) Patent No.: US 12,763,085 B2
(45) Date of Patent: Oct. 13, 2026

(54) AUDIO DIRECTIVITY CODING

(71) Applicant: Fraunhofer-Gesellschaft zur Foerderung der angewandten Forschung e.V., Munich (DE)

(72) Inventors: Juergen Herre, Erlangen (DE); Florin Ghido, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 202 days.

(21) Appl. No.: 18/519,335

(22) Filed: Nov. 27, 2023

(65) Prior Publication Data

US 2024/0096339 A1 Mar. 21, 2024

Related U.S. Application Data

(63) Continuation of application No. PCT/EP2022/064343, filed on May 25, 2022.

(30) Foreign Application Priority Data

May 27, 2021 (EP) .................................... 21176342

(51) Int. Cl.
*G10L 19/08* (2013.01)
*G10L 19/02* (2013.01)
*G10L 19/06* (2013.01)

(52) U.S. Cl.
CPC .............. *G10L 19/08* (2013.01); *G10L 19/02* (2013.01); *G10L 19/06* (2013.01)

(58) Field of Classification Search
None
See application file for complete search history.

(56) References Cited

U.S. PATENT DOCUMENTS

2011/0249821 A1* 10/2011 Jaillet .................. G10L 19/008 381/22
2018/0277130 A1 9/2018 Johnston et al.

(Continued)

FOREIGN PATENT DOCUMENTS

CN 110678923 A 1/2020
CN 111542877 A 8/2020

(Continued)

OTHER PUBLICATIONS

Piotr Majdak et al., "Spatially Oriented Format for Acoustics: A Data Exchange Format Representing Head-Related Transfer Functions", 134th Convention of the Audio Engineering Society, convention paper 8880, May 2013. AES Convention 134; May 1, 2013, XP040575102 (11 pages). (Year: 2013).*

(Continued)

*Primary Examiner* — Anne L Thomas-Homescu
(74) *Attorney, Agent, or Firm* — Ashurst Perkins Coie US LLP; Michael A. Glenn

(57) ABSTRACT

An apparatus for decoding audio metadata displaced in different directions associated with discrete positions on a unit sphere, which is displaced according to parallel lines from an equatorial line towards a poles, comprises:
- a bitstream reader reading prediction residual values;
- a prediction section receiving the audio metadata from prediction residual values of the audio metadata using a plurality of prediction sequences, which include:
  - an initial prediction sequence, along a line of adjacent discrete positions, predicting the audio metadata based on the immediately preceding audio metadata in the same initial predictions sequence; and
  - subsequent prediction sequences, divided among subsequences, each moving along a parallel line and being adjacent to a previously predicted parallel line, (Continued)

such that audio metadata along a parallel line being processed are predicted based on at least:

audio metadata of the adjacent discrete positions in the same subsequence; and interpolated versions of the already predicted audio metadata.

38 Claims, 13 Drawing Sheets

(56) References Cited

U.S. PATENT DOCUMENTS

| | | | | |
|---|---|---|---|---|
| 2020/0265851 | A1* | 8/2020 | Fuchs | H03M 7/6011 |
| 2020/0321013 | A1 | 10/2020 | Lasse et al. | |
| 2021/0118452 | A1 | 4/2021 | Tsingos et al. | |

FOREIGN PATENT DOCUMENTS

| | | | | |
|---|---|---|---|---|
| JP | 2021503628 | A * | 2/2021 | G10L 19/167 |
| TW | 201923751 | A | 6/2019 | |
| WO | 2014013070 | A1 | 1/2014 | |
| WO | WO-2021001358 | A1 * | 1/2021 | H04S 7/302 |

OTHER PUBLICATIONS

Frank Wefers, "OpenDAFF: A free, open-source software package for directional audio data", DAGA 2010, Mar. 2010 (2 pages). (Year: 2010) (Year: 2010).*

Majdak, Piotr, et al. "Spatially oriented format for acoustics: A data exchange format representing head-related transfer functions." Audio Engineering Society Convention 134. Audio Engineering Society, 2013. (Year: 2013).*

Andreas Silzle et al: "First version of Text of Working Draft of RM0", 138. MPEG Meeting; Apr. 25, 2022-Apr. 29, 2022; Online; (Motion Picture Expert Group or ISO/IEC JTC1/SC29/WG11), No. m59696 Apr. 20, 2022 (Apr. 20, 2022), XP030301903—40 pages.

Frank Wefers, "OpenDAFF: A free, open-source software package for directional audio data", DAGA 2010, Mar. 2010 (2 pages).

ISO 23090-4:202#(X) ISO/IEC JTC 1/SC 29/WG 6, Date: 2022-MM-DD (273 pages).

MPEG-1 6DoF Audio Encoder Input Format, 130. MPEG Meeting; Apr. 20, 2020-Apr. 24, 2020; Alpbach ; (Motion Picture Expert Group or ISO/ IEC JTC1/SC29/ WG11),No. n19211 Apr. 25, 2020 (Apr. 25, 2020) , XP030285463 (32 pages).

Piotr Majdak et al., "Spatially Oriented Format for Acoustics: A Data Exchange Format Representing Head-Related Transfer Functions",134th Convention of the Audio Engineering Society, convention paper 8880, May 2013. AES Convention 134; May 1, 2013, XP040575102 (11 pages).

Wang, Jiaqing; Wu, Bingzhen, Real-Time Implementation of G.723.1 Speech Codec on DSP. Aug. 19, 2005—3 pp.

* cited by examiner

AUDIO DIRECTIVITY CODING

CROSS-REFERENCE TO RELATED APPLICATIONS

This application is a continuation of copending International Application No. PCT/EP2022/064343, filed May 25, 2022, which is incorporated herein by reference in its entirety, and additionally claims priority from European Application No. 21176342.0, filed May 27, 2021, which is also incorporated herein by reference in its entirety.

There are here disclosed apparatuses and methods for encoding and decoding audio signals having directivity.

BACKGROUND OF THE INVENTION

Directivity is an important acoustic property of a sound source e.g. in an immersive reproduction environment. Directivity is frequency dependent and may be measured on discrete frequencies on an octave or third octave frequency grid. For a given frequency, the directivity is a scalar value defined on the unit sphere. The estimation may be done using a number of microphones distributed evenly on a sphere. The measurements are then postprocessed, and then accurately interpolated on a fine or very fine spherical grid. The values are saved into one of the available interoperability file formats, such as SOFA files [1]. These files can be quite large, up to several megabytes.

However, for inclusion into a bitstream for transmission, a much more compact representation is needed, where the size is reduced to a dimension from several hundred bytes to at most a few kilobytes, depending on the number of frequency bands and the accuracy desired for reconstruction (e.g., reduced accuracy on mobile devices).

There are several file formats supporting directivity data, like SOFA [1] and OpenDAFF [2], however their main goals are to be very flexible interchange formats, and also to preserve a significant amount of additional metadata, like how the data was generated, and what equipment was used for the measurements. This additional metadata makes it easier to interpret and load the data automatically in research applications, because some file formats allow a large number of heterogeneous data types. Moreover, the spherical grid usually defined is fine or very fine, so that the much simpler approach of using the closest neighbor search can be used instead of 2D interpolation.

A system for obtaining more compact representations are pursued.

REFERENCES

[1] Piotr Majdak et al., "Spatially Oriented Format for Acoustics: A Data Exchange Format Representing Head-Related Transfer Functions", 134th Convention of the Audio Engineering Society, convention paper 8880, May 2013.

[2] Frank Wefers, "OpenDAFF: A free, open-source software package for directional audio data", DAGA 2010, March 2010.

SUMMARY

According to an embodiment, an apparatus for decoding audio values from a bitstream, the audio values being according to different directions, the directions being associated with discrete positions on a unit sphere, the discrete positions on the unit sphere being displaced according to parallel lines from an equatorial line towards a first pole from the equatorial line towards a second pole, may have: a bitstream reader configured to read prediction residual values from the bitstream; a prediction section configured to obtain the audio values by prediction and from prediction residual values, the prediction section using a plurality of prediction sequences including: at least one initial prediction sequence, along a line of adjacent discrete positions, predicting audio values based on the audio values of the immediately preceding audio values in the same initial predictions sequence; and at least one subsequent prediction sequence, divided among a plurality of subsequences, each subsequence moving along a parallel line and being adjacent to a previously predicted parallel line, and being such that audio values along a parallel line being processed are predicted based on at least: audio values of the adjacent discrete positions in the same subsequence; and interpolated versions of the audio values of the previously predicted adjacent parallel line, each interpolated version of the adjacent previously predicted parallel line having the same number of discrete positions of the parallel line being processed.

According to another embodiment, an apparatus for encoding audio values according to different directions, the directions being associated with discrete positions on a unit sphere, the discrete positions on the unit sphere being displaced according to parallel lines from an equatorial line towards two poles, may have: a predictor block configured to perform a plurality of prediction sequences including: at least one initial prediction sequence, along a line of adjacent discrete positions, by predicting audio values based on the audio values of the immediately preceding audio values in the same initial predictions sequence; and at least one subsequent prediction sequence, divided among a plurality of subsequences, each subsequence moving along a parallel line and being adjacent to a previously predicted parallel line, and being such that audio values are predicted based on at least: audio values of the adjacent discrete positions in the same subsequence; and interpolated versions of the audio values of the previously predicted adjacent parallel line, each interpolated version having the same number of discrete positions of the parallel line, a prediction residual generator configured to compare the predicted values with actual audio values to generate prediction residual values; a bitstream writer configured to write the prediction residual values, or a processed version thereof, in a bitstream.

According to another embodiment, an apparatus for decoding audio metadata from a bitstream, the audio metadata being according to different directions, the directions being associated with discrete positions on a unit sphere, the discrete positions on the unit sphere being displaced according to parallel lines from an equatorial line towards a first pole from the equatorial line towards a second pole, may have: a bitstream reader configured to read prediction residual values of the encoded audio metadata from the bitstream; a prediction section configured to obtain the audio metadata by prediction and from prediction residual values of the audio metadata, the prediction section using a plurality of prediction sequences including: at least one initial prediction sequence, along a line of adjacent discrete positions, predicting the audio metadata based on the immediately preceding audio metadata in the same initial predictions sequence; and at least one subsequent prediction sequence, divided among a plurality of subsequences, each subsequence moving along a parallel line and being adjacent to a previously predicted parallel line, and being such that audio metadata along a parallel line being processed are predicted based on at least: audio metadata of the adjacent discrete positions in the same subsequence; and interpolated versions of the audio metadata of the previously predicted adjacent parallel line, each interpolated version of the adjacent previously predicted parallel line having the same number of discrete positions of the parallel line being processed.

According to another embodiment, an audio decoding method for decoding audio values according to different directions, the directions being associated with discrete positions on a unit sphere, the discrete positions on the unit sphere being displaced according to parallel lines from an equatorial line towards a first pole from the equatorial line towards a second pole, may have the steps of: reading prediction residual values from a bitstream; decoding the prediction residual values and predicted values from a plurality of prediction sequences including: at least one initial prediction sequence, along a line of adjacent discrete positions, predicting audio values based on the audio values of the immediately preceding audio values in the same initial predictions sequence; and at least one subsequent prediction sequence, divided among a plurality of subsequences, each subsequence moving along a parallel line and being adjacent to a previously predicted parallel line, and being such that audio values along a parallel line being processed are predicted based on at least: the audio values of the adjacent discrete positions in the same subsequence; and interpolated versions of the audio values of the adjacent previously predicted parallel line, each interpolated version of the adjacent previously predicted parallel line having the same number of discrete positions of the parallel line being processed.

Another embodiment may have a non-transitory digital storage medium having a computer program stored thereon to perform the method for decoding audio values according to different directions, when said computer program is run by a computer.

There is proposed an apparatus for decoding an audio signal encoded in a bitstream, the audio signal having different audio values according to different directions, the directions being associated with discrete positions in a unit sphere, the discrete positions in the unit sphere being displaced according to parallel lines from an equatorial line towards a first pole from the equatorial line towards a second pole, the apparatus comprising:

- a bitstream reader configured to read prediction residual values of the encoded audio signal from the bitstream;
- a prediction section configured to obtain the audio signal by prediction and from prediction residual values of the encoded audio signal, the prediction section using a plurality of prediction sequences including:
  - at least one initial prediction sequence, along a line of adjacent discrete positions, predicting audio values based on the audio values of the immediately preceding audio values in the same initial predictions sequence; and
  - at least one subsequent prediction sequence, divided among a plurality of subsequences, each subsequence moving along a parallel line and being adjacent to a previously predicted parallel line, and being such that audio values along a parallel line being processed are predicted based on at least:
    - audio values of the adjacent discrete positions in the same subsequence; and
    - interpolated versions of the audio values of the previously predicted adjacent parallel line, each interpolated version of the adjacent previously predicted parallel line having the same number of discrete positions of the parallel line being processed.

There is also proposed an apparatus for encoding an audio signal, the audio signal having different audio values according to different directions, the directions being associated with discrete positions in a unit sphere, the discrete positions in the unit sphere being displaced according to parallel lines from an equatorial line towards two poles, the apparatus comprising:

- a predictor block configured to perform a plurality of prediction sequences including:
  - at least one initial prediction sequence, along a line of adjacent discrete positions (10), by predicting audio values based on the audio values of the immediately preceding audio values in the same initial predictions sequence; and
  - at least one subsequent prediction sequence, divided among a plurality of subsequences, each subsequence moving along a parallel line and being adjacent to a previously predicted parallel line, and being such that audio values are predicted based on at least: audio values of the adjacent discrete positions in the same subsequence; and
    - interpolated versions of the audio values of the previously predicted adjacent parallel line, each interpolated version having the same number of discrete positions of the parallel line,
- a prediction residual generator (120) configured to compare the predicted values with actual values of the audio signal (102) to generate prediction residual values (122);
- a bitstream writer (130) configured to write the prediction residual values (122), or a processed version thereof, in a bitstream (104).

BRIEF DESCRIPTION OF THE DRAWINGS

Embodiments of the present invention will be detailed subsequently referring to the appended drawings, in which.

DETAILED DESCRIPTION OF THE INVENTION

Encoder and Encoder Method

Figure 1A:
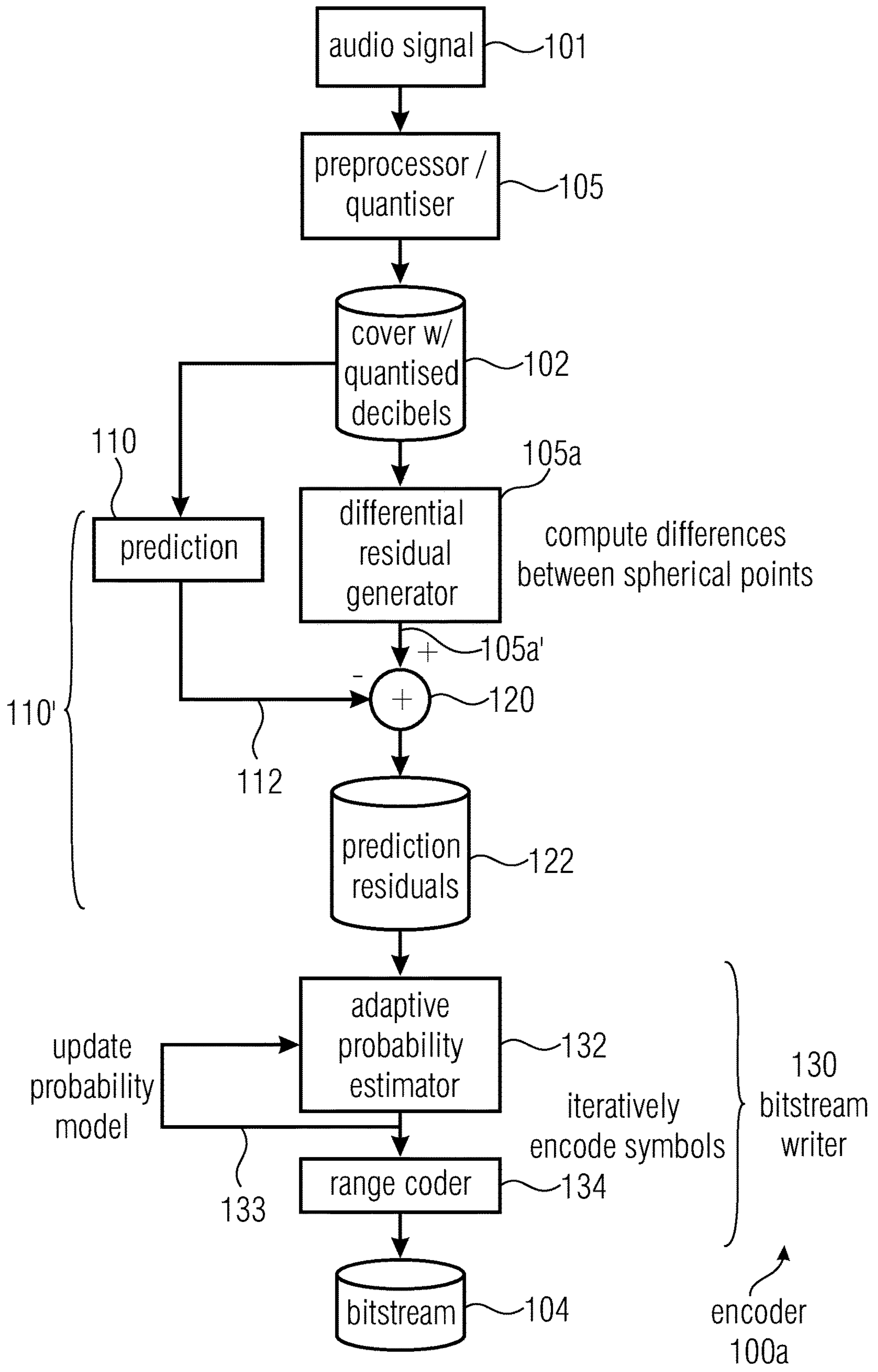
FIG. 1*a*, 1*b*, 1*c*, 1*d*, 1*e*, 1*f*, show examples of encoders.
Figure 1B:
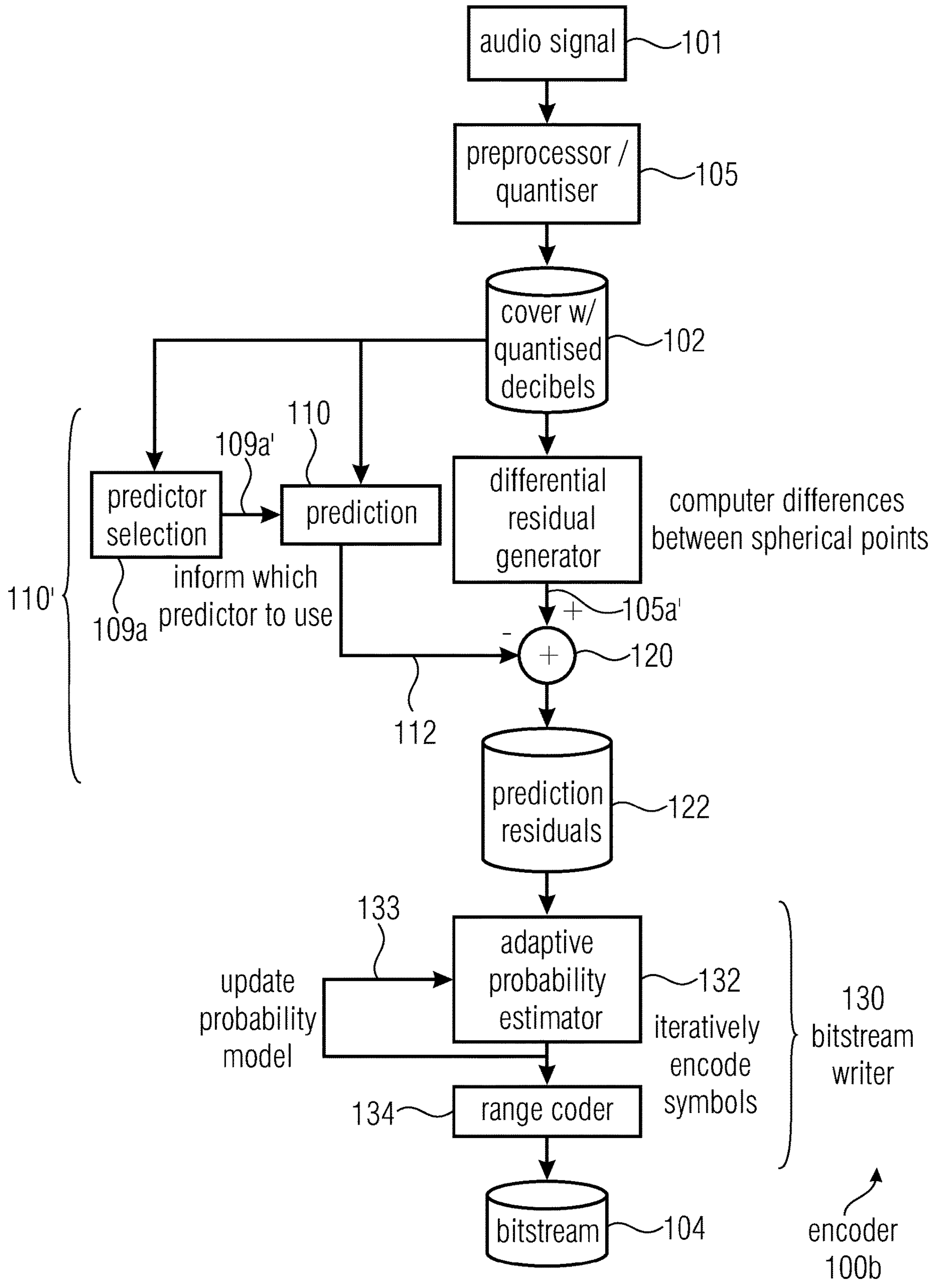
Figure 1C:
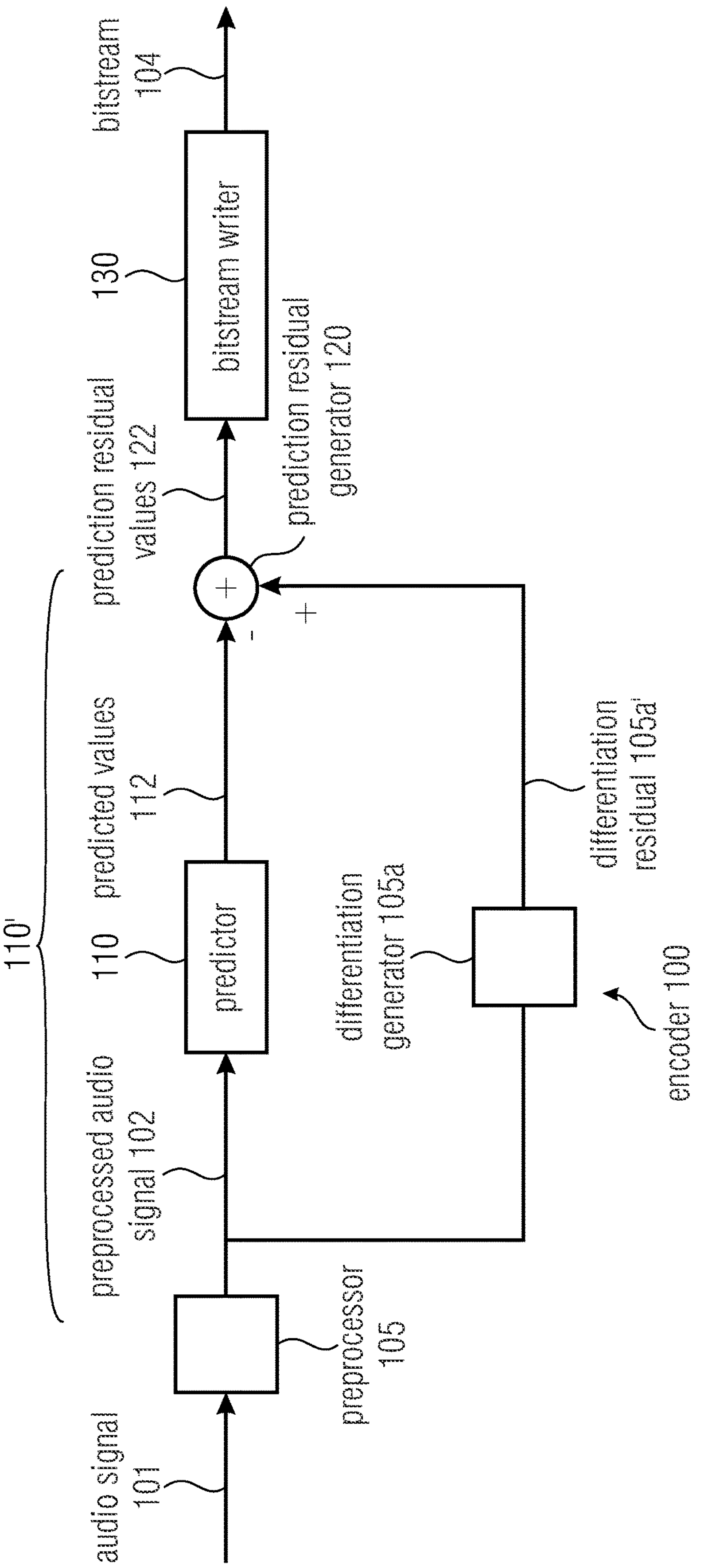
Figure 1D:
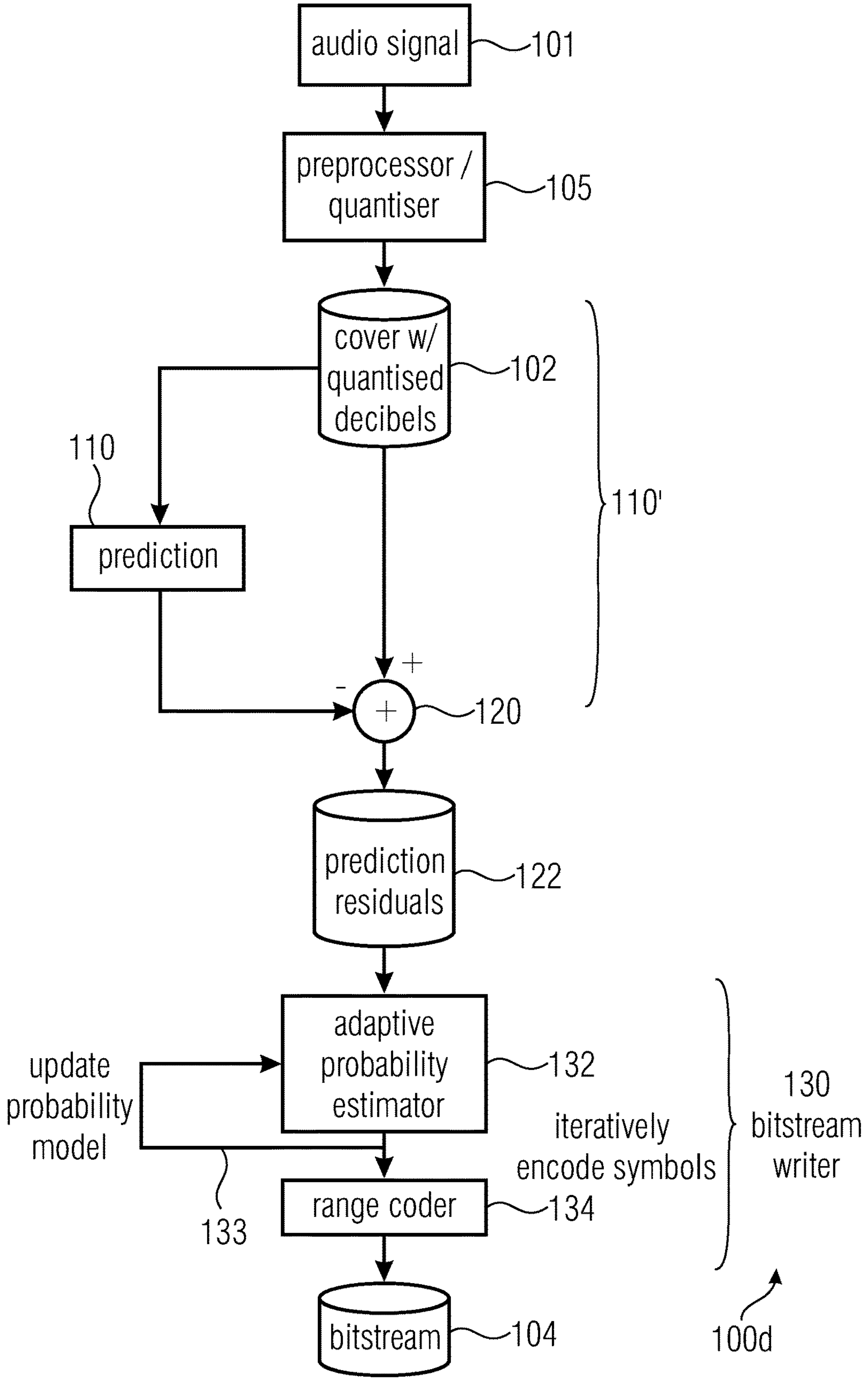
Figure 1E:
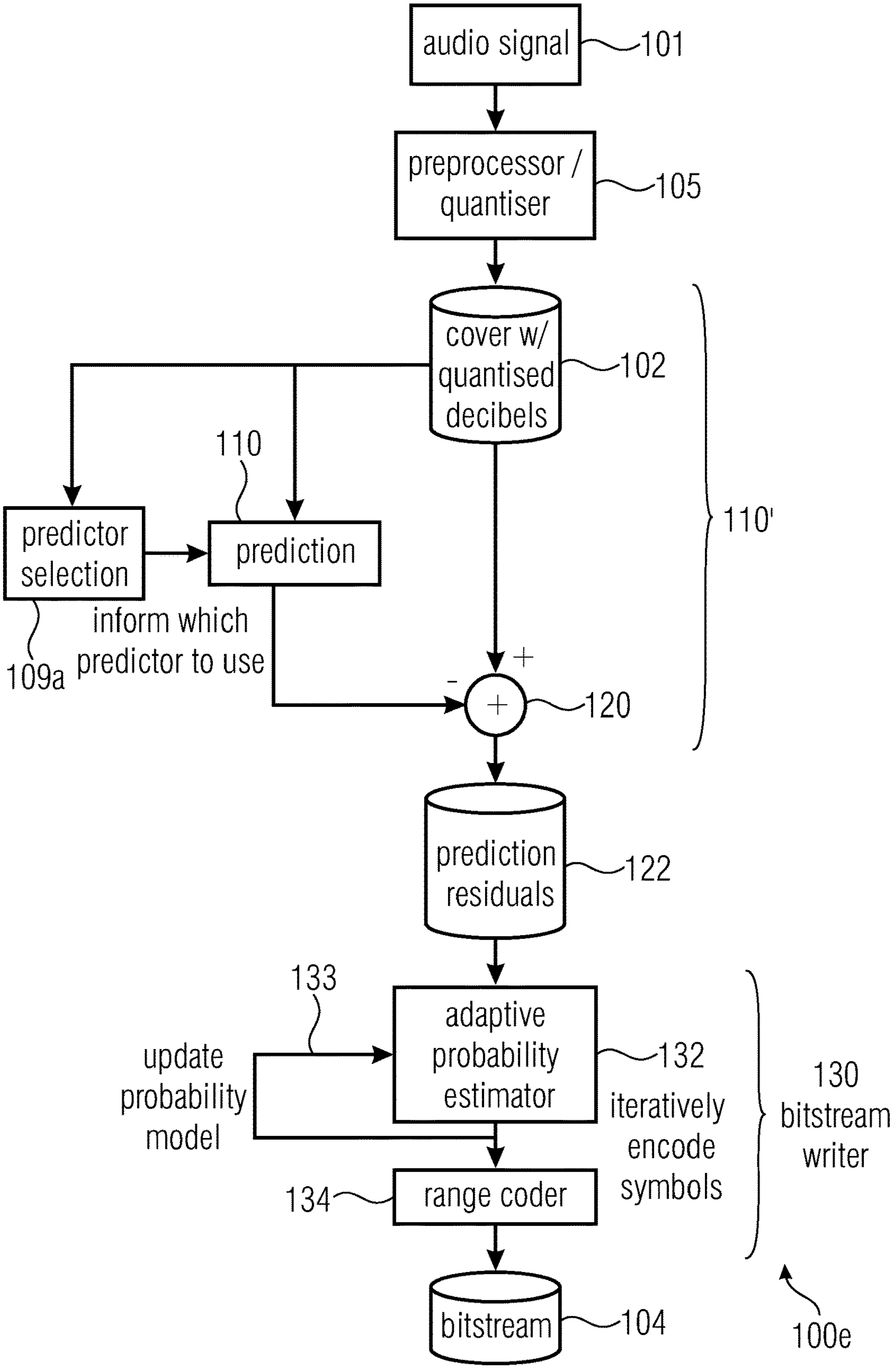
Figure 1F:
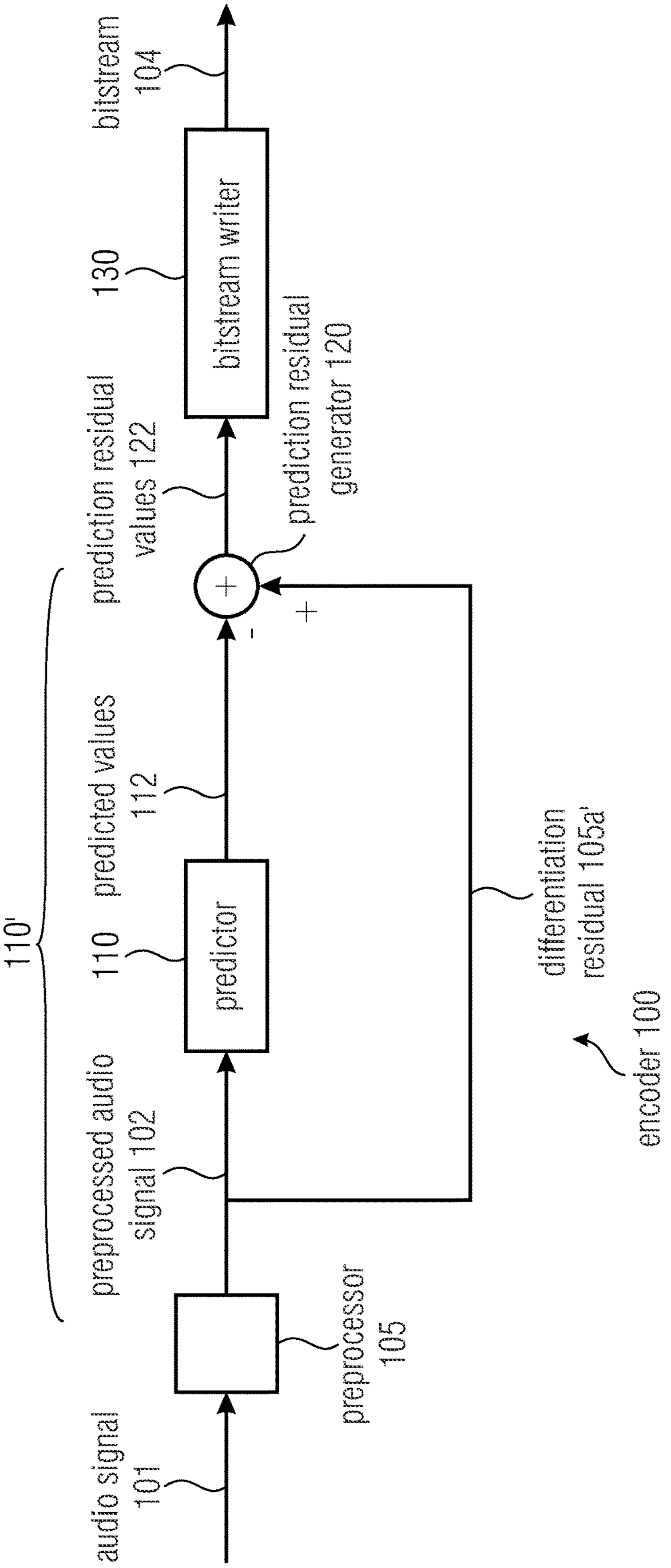

FIG. 1*f* shows an example of an encoder 100. The encoder 100 may perform predictions (e.g. 10, 20, 30, 40, see below) from the audio signals 101 (e.g. in their processed version 102), to obtain predicted values 112. A prediction residual generator 120 may generate prediction residual values 122 of the predicted values 112. An example of operation of the prediction residual generator 120 may be subtracting the predicted values 112 from the audio signal values 102 (e.g., a difference between an adjacent value of the signal 102 and the predicted value 112). The audio signal 102 is here below also called “cover”. The predictor block 110 and the prediction residual generator 120 may constitute a prediction section 110'. The prediction residual values 122 may be inputted into the bitstream writer 130 to generate a bitstream 104. The bitstream writer 130 may include, for example, an entropy coder.

The audio signal 102 may be a preprocessed version of an audio signal 101 (e.g. as outputted by a preprocessor 105). The preprocessor 105 may, for example, perform at least one of:

1) converting the audio signal 101 from a linear scale onto a logarithmic scale (e.g. decibel scale)
2) decomposing the audio signal among different frequency bands The preprocessor 105 may decompose, in different frequency bands, the audio signal 101, so that the preprocessed audio signal 102 includes a plurality of bandwidths (e.g., from a lowest frequency band to a highest frequency band. The operations at the predictor block 110, the prediction residual generator 120 (or more in general at the prediction section 110'), and/or the bitstream writer 130 may be repeated for each band.

It will be shown that it is also possible to perform a prediction selection to decide which type (e.g. order) of prediction is to be performed (see below).

FIG. 1*c* shows a variant of FIG. 1*f*, in which a differentiation generator 105*a* generates a differentiation residual 105*a*' with respect to the preceding frequency band (this cannot be carried out for the first, lowest, frequency band). The preprocessed audio signal 102 may be subjected to differentiation at the differentiation residual generator 105*a*, to generate differentiation residuals 105*a*. The prediction section 110' may perform a prediction on the signal 102, to generate a predicted value 112.

Figure 5:
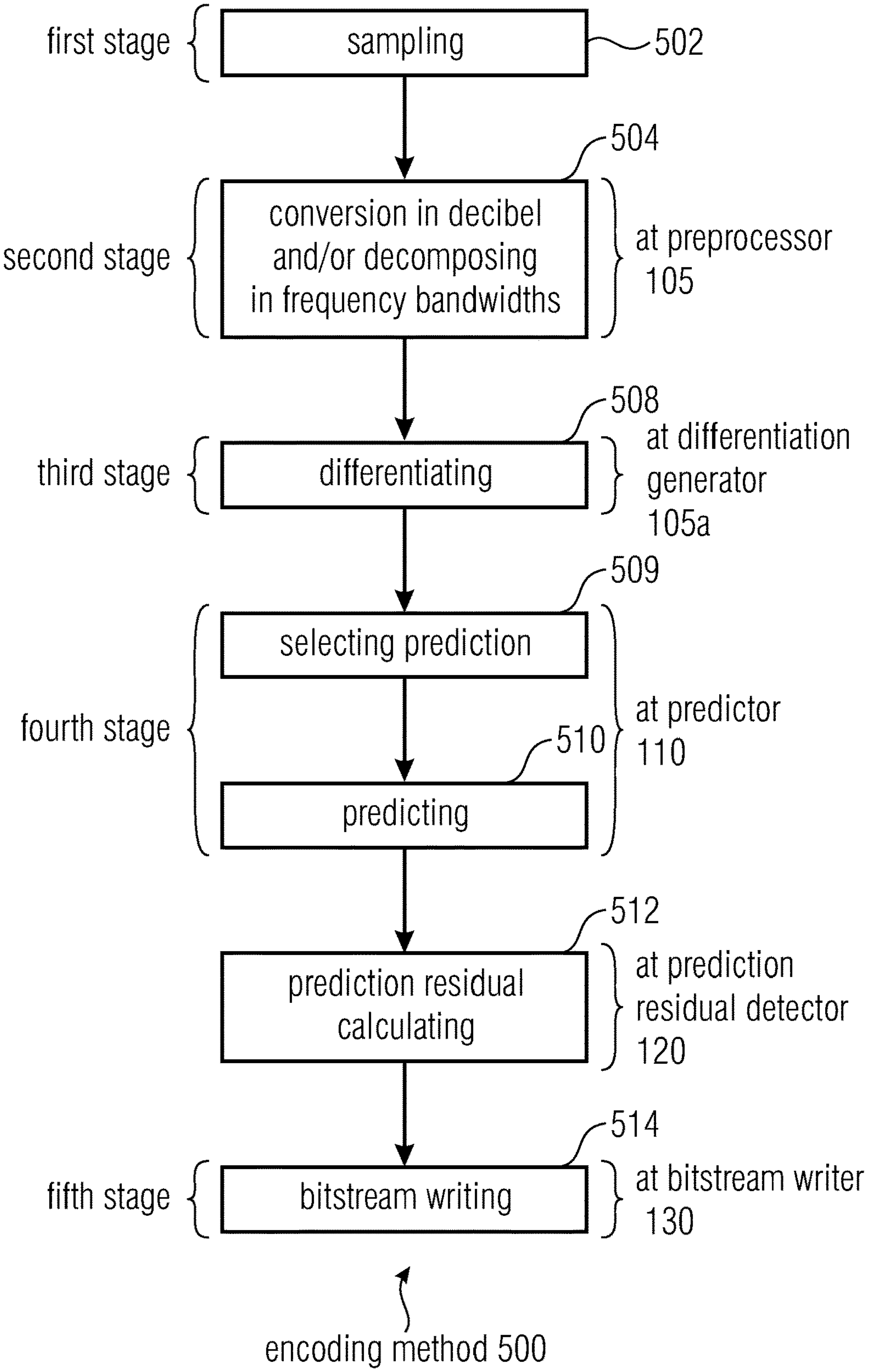
FIG. 5 shows an example of an encoding operation.

FIG. 5 shows an example of encoding operation 500. At least some of the steps may be performed by the encoder 100, 100*a*, 100*b*, 100*d*, 100*e*, 100*f*.

A first encoding operation 502 (first stage) may be a sampling operation, according to which a directional signal is obtained. However, the sampling operation 502 is not to be necessarily performed in the method 500 or by the encoder 100, 100*a*, 100*b*, and can be performed, for example, by an external device (and the audio signal 101 may therefore be stored in a storage, or transmitted to the encoder 100, 100*a*, 100*b*).

A step 504 comprises a conversion in decibel or another logarithmic scale of the values obtained and/or decomposing the audio signal 101 onto different frequency bands. The subsequent steps 508-514 may be therefore performed for each band, e.g. in logarithmic (e.g. decibel) domain.

At step 508, a third stage of differentiating may be performed (e.g., to obtain a differential value for each frequency band). This step may be performed by the differentiation generator 105*a*, and may be skipped in some examples (e.g. in FIG. 1*f*).

At least one of the steps 504 and 508 (second and third stages) may be performed by the preprocessor 105, and may provide, for example, a processed version 102 of the audio signal 101 (the prediction may be performed on the processed version). However, it is not strictly necessary that the steps 504 and 508 are performed by the encoder 100, 100*a*, 100*b*, 100*d*, 100*e*, 100*f*: in some examples, the steps 504 and/or 508 may be performed by an external device, and the processed version 102 of the audio signal 101 may be used for the prediction.

At steps 509 and 510, a fourth stage of predicting audio values (e.g., for each frequency band) is performed (e.g. by the predictor block 110). An optional state 509 of selecting the prediction is performed may be performed by simulating different predictions (e.g. different orders of predictions) to be performed, and deciding to use the prediction which, according to the simulation, provides the best prediction effect. For example, the best prediction effect may be the one which minimizes the prediction residuals and/or the one which minimizes the length of the bitstream 104. At step 510, the prediction is performed (if step 509 has been performed, the prediction is the prediction chosen at step 509, other ways the prediction is predetermined).

At step 512, a prediction residual calculating step may be performed. This can be performed by the prediction residual generator 120 (or more in general by the prediction section 110'). For example, the prediction residual 112 between the audio signal 101 (or its processed version 102) may be calculated, to be encoded in the bitstream.

At step 514, a fifth stage of bitstream writing may be performed, for example, by the bitstream writer 130. The bitstream writing 514 may be subjected, for example, to a compression, e.g. by substituting the prediction residuals 112 with codes, to minimize the bitlength in the bitstream 104.

FIG. 1*a* (and its corresponding FIG. 1*d*, which lacks of the residual generator 105*a*) shows an encoder 100*a* (respectively 100*d*), which can be used instead of the encoder 100 of FIG. 1. The audio signal 101 is pre-processed and/or quantized at pre-processing block 105*a*. Accordingly, a pre-processed audio signal 102 may be obtained. The pre-processed audio signal 102 may be used for prediction at the predictor block 110 (or more in general at the prediction section 110'), so as to obtain predicted values 112. A differential residual generator 105*a* (in FIGS. 1*a*-1*c*, but not in FIGS. 1*d*-1*e*) may output differential residuals 105*a*'. A prediction residual generator 120 can generate prediction residuals 102, by subtracting the results of the predictions 112 from the differential residual 105*a*'. In the examples of FIGS. 1*d*-1*e*, the residual 122 is generated by the difference between the predicted values 112 and the real values 102. The prediction residuals 122 may be coded in a bitstream writer 130. The bitstream writer 130 may have another reductive probability estimate 132, which estimates the probability of each code. The probability may be updated as can be seen by the feedback line 133. A range coder 134 may be inserted in codes according to their probabilities into the bitstream 104.

FIG. 1*b* (and its corresponding FIG. 1*e*, which lacks of the residual generator 105*a*) shows an example similar to the example of FIG. 1*a* of an encoder 100*b* (respectively 100*e*). The difference from the example of FIG. 1*a* is in that a predictor selection block 109*a* (part of the prediction section 110') may perform a prediction 109*a*' (which may be carried out at the selected prediction step 509) to decide which order of predictions to use, for example (the orders of predictions are disclosed in FIGS. 6 and 7, see below).

Different frequency bands may have the same spatial resolution.

Decoder and Decoding Method

Figure 2A:
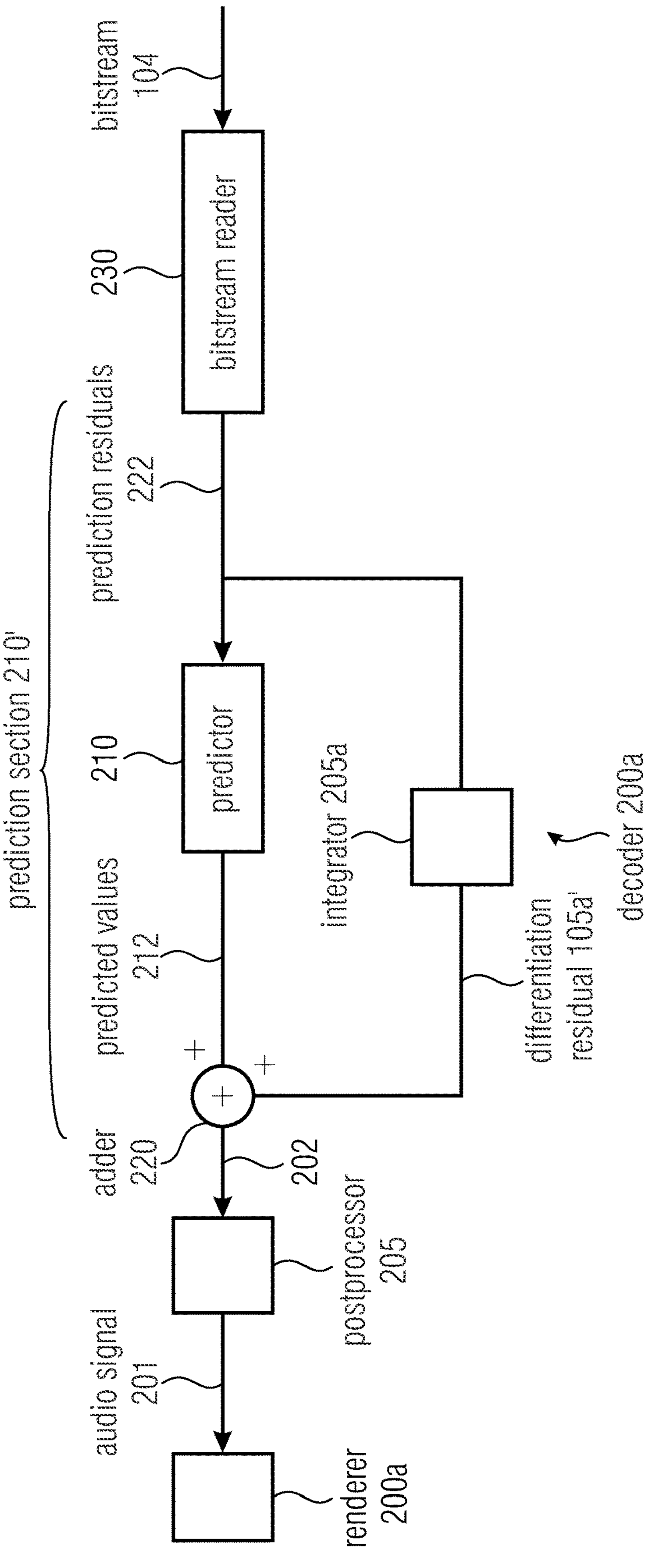
FIG. 2*a*, 2*b* show examples of decoders.
Figure 2B:
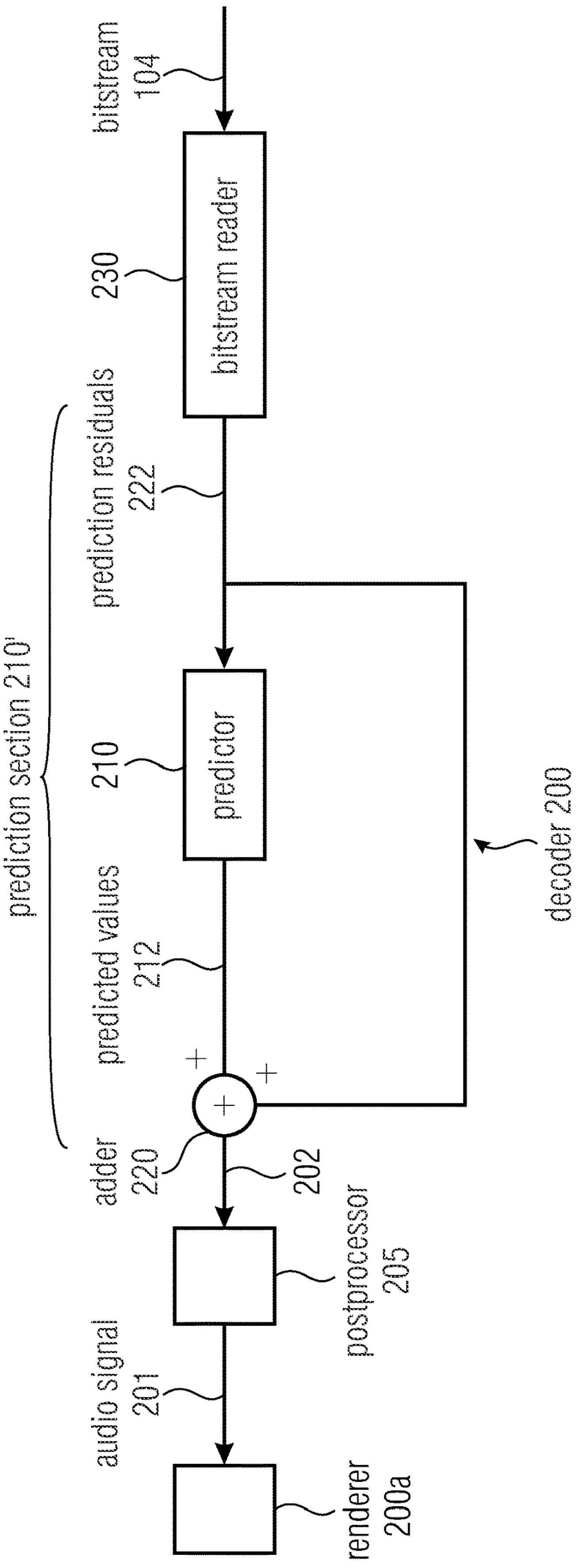

FIGS. 2*a* and 2*b* show each an example of a decoder 200*a*, 200 (the difference between the two decoders is that decoder 200 of FIG. 2*a* fails to present the integrator 205*a*, which has the role reversed with respect to the differentiation block 105*a* of FIGS. 1*a*-1*c*). The decoder 200 may read a bitstream 104 (e.g., the bitstream as generated by the encoder 100, 100*b*, 100*c*, 100*e*, 100*f*, 100*d*). The bitstream reader 230 may provide values 222 as decoded from the bitstream 104. The values 222 may represent prediction residual values 122 of the encoder. the prediction residual values As explained above, the prediction residual values 222 may be different for different frequency bands. The values 222 may be inputted to a predictor block 210 and to an integrator 205*a*. The predictor block 210 may predict predicted values 122 in the same way as the predictor block 110 of the encoder, but with a different input.

The output of the prediction residual adder 220 may be values 212 to be predicted. The values of the audio signal to be predicted are submitted to a predictor block 210. Predictive values 212 may be obtained.

In general terms, the predictor 210 and the adder 220 (and integrator block 205*a*, if provided) are part of a prediction section 210'.

The values 202 may then be subjected to a post-processor 205 e.g., by converting from logarithmic (decibel) domain onto the linear domain; by composing the different frequency bands.

Figure 4:
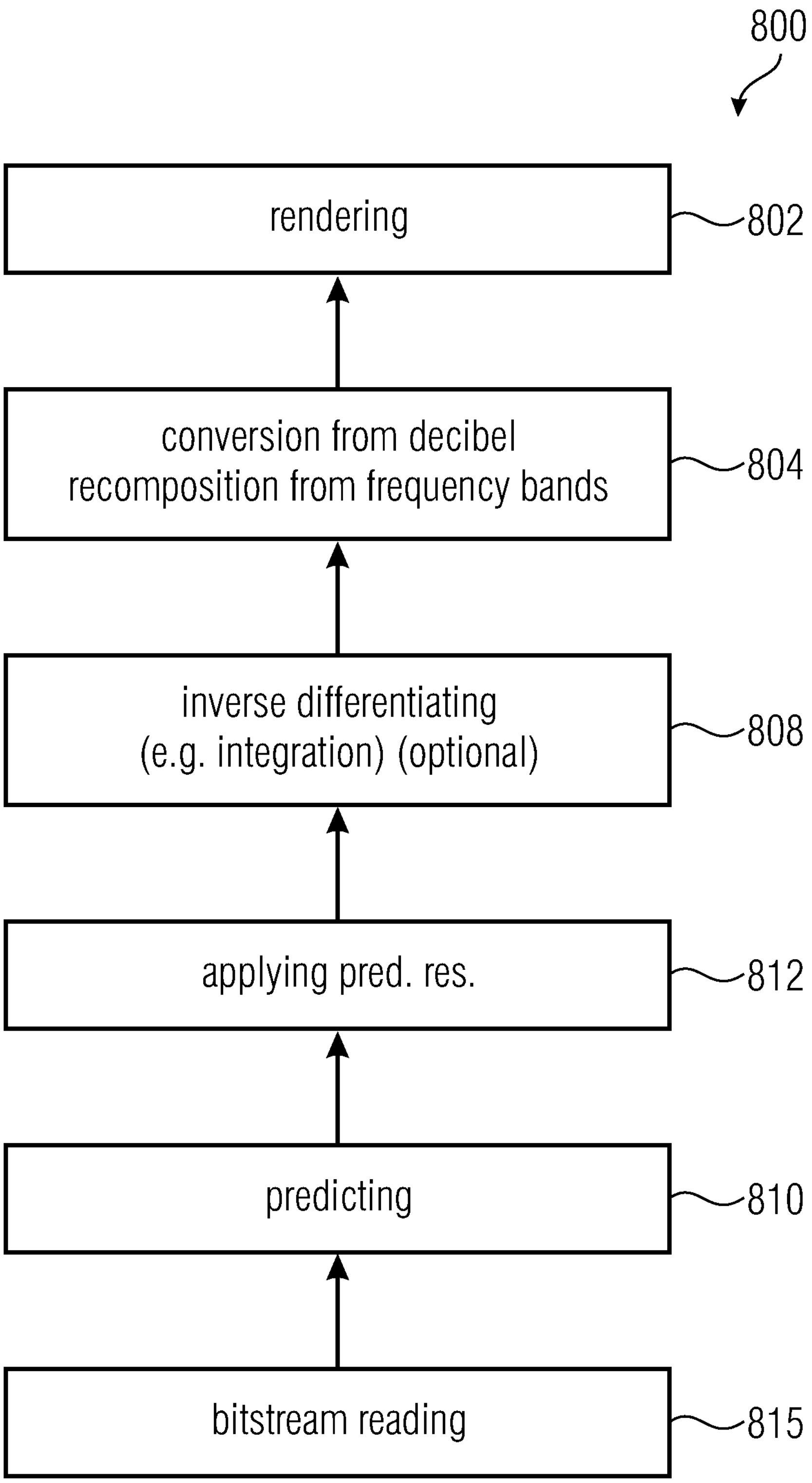
FIG. 4 shows an example of decoding method.

FIG. 4 shows an example of decoding method 800, which may be performed, for example, by the decoder 200. At step 815 there may be an operation of bitstream reading, to read the bitstream 104. At step 810 there may be an operation of predicting (e.g., see below). At step 812 there is an operation of applying the prediction residual, e.g. at the prediction residual adder 220. At step 808 (optional) there may be an operation of inverse differentiation (e.g. summation, integration), e.g. at block 205*a*. At step 804 there may be an operation of conversion from logarithmic domain (decibel) to the linear domain and/or of recomposition of the frequency bands. At step 802 there may be a rendering operation.

Different frequency bands may have the same spatial resolution.

Coordinates in the Unit Sphere

Figure 3:
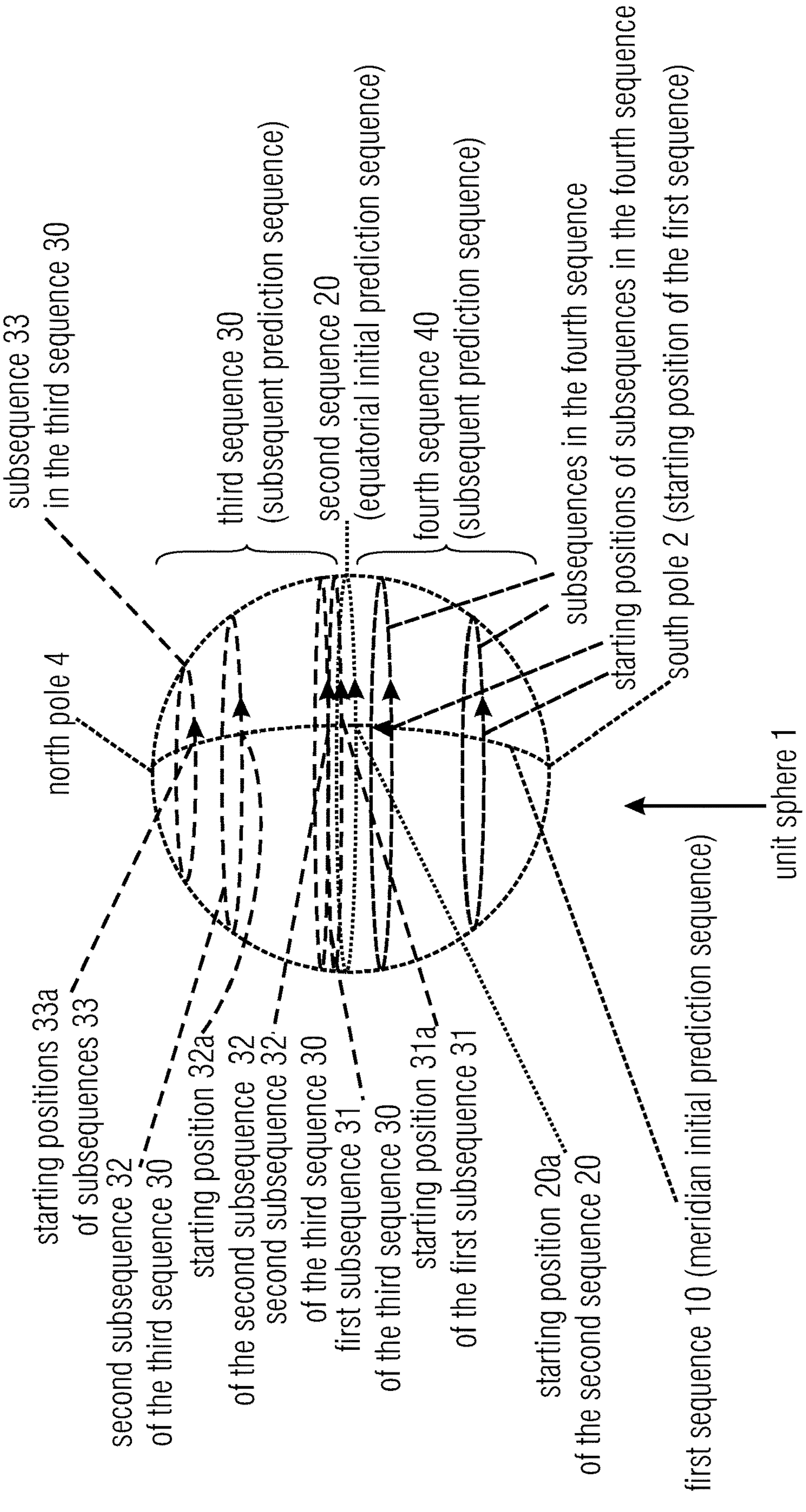
FIG. 3 shows how predictions may be performed.

FIG. 3 shows an example of the coordinate system which is used to encode an audio signal 101 (102). The audio signal 101 (102) is directional, in the sense that different directions have in principle different audio values (which may be in logarithmic domain, such as a decibel). In order to provide audio values for different directions, a unit sphere 1 is used as a coordinate reference (FIG. 3). The coordinate reference is used to represent the directions of the sound, imagining that human listener to be in the center of the sphere. Different directions of provenience of sound are associated with different positions in the unit sphere 1. The positions in the unit sphere 1 are discrete, since it is not possible to have a value for each possible direction (which are theoretically in an infinite number). The discrete positions in the unit sphere 1 (which are also called "points" in some parts below) may be displaced according to a coordinate system which resembles the geographic coordinate system normally used for the planet Earth (the listener being positioned in the center of the Earth) or for Astronomical coordinates. Here, a north pole 4 (over the listener) and a south pole 2 (below the listener) are defined. An equatorial line is also present (corresponding to the line 20 in FIG. 3), at the height of the listener. The equatorial line is a circumference having, as a diameter, the diameter of the unit sphere 1. A plurality of parallel lines (circumferences) are defined between the equatorial line and each of the two poles. From the equatorial line towards the north pole 4, a plurality of parallel lines are therefore defined with monotonically decreasing diameter, covering the northern hemisphere. The same applies for the succession from the equatorial line towards the south pole 2 thorough other parallel lines, covering the southern hemisphere. The equatorial lines are therefore associated to different elevations (elevation angles) of the audio signal. It may be understood that the parallel lines (including the equatorial line), plus the south pole 2 and the north pole 4, cover the totality of the unit sphere 1. Therefore, each parallel line and each pole is associated to one unique elevation (e.g. the equatorial line being associated to an elevation 0°, the north pole to 90°, the parallel lines in the northern hemisphere having an elevation between 0° and 90°, the south pole to −90°, and the parallel lines in the southern hemisphere having an elevation between −90° and 0°). Furthermore, at least one meridian may be defined (in FIG. 3, one meridian is shown in correspondence of the reference numeral 10). The at least one meridian may be understood as an arch of circumference which goes from the south pole 2 toward the north pole 4. The at least one meridian may represent an arch (e.g. a semi circumference) of the maximum circumference in the unit sphere 1, from pole to pole. The circumferential extension of the meridian may be the half of the circumferential extension of the equatorial line. We may considered the north pole 4 and the south pole 2 to be part of the meridian. It is to be noted that at least one meridian is defined, being formed by the discrete positions aligned with each other. However, by virtue of azimuthal misalignments between the discrete positions of adjacent parallel lines, it is not guaranteed that there are other meridians all along the surface of the unit sphere 1. This is not an issue, since it is sufficient that only one single meridian is identified, formed by discrete positions (taken from different parallels) which are aligned with each other. The discrete positions may be measured, for each parallel line, by azimuthal angles with respect to a reference azimuth 0°. The meridian may be at the reference azimuth 0°, and may therefore may be used as a reference meridian for the measurement of the azimuth. Therefore, each direction may be associated to a parallel or pole, with a particular elevation, and a meridian (through a particular azimuth).

In examples, the coordinates may be expressed, instead of angles, in terms of indexes, such as:

1) An elevation index ei (indicating the parallel of the currently predicted discrete position, the equator having ei=0 corresponding to the elevation 0°, the south pole and the parallel lines in the southern hemisphere having indexes with negative numbers, the north pole and the parallel lines in the northern hemisphere having indexes with positive numbers)
2) An azimuth index ai (indicating the azimuthal angle of the currently predicted discrete position; the reference meridian having ai=0, corresponding to an azimuth=0°, the subsequent discrete positions being progressively numbered)
3) So that the value (sometimes expressed as cover[ei][ai]) indicates the predicted value in the discrete position, once predicted.

Preprocessing and Differentiating at the Encoder

Some preprocessing (e.g. 504) and differentiating (e.g. 508) may be performed onto the audio signal 101, to obtain a processed versions 102, e.g. through the preprocessor 105, and/or to obtain a differentiation residual version 105*a*', e.g. through the differentiation residual generator 105*a*.

For example, the audio signal 101 may be decomposed (at 504) among the different frequency bands. Each prediction process (e.g. at 510) may be performed, subsequently, for a specific frequency band. Therefore the encoded bitstream 104 may have, encoded therein, different prediction residuals for different frequency bands. Therefore, in some examples, the discussion below regarding the predictions (prediction sequences, prediction subsequences sphere unit, and so on) is valid for each frequency band, and may be repeated for the other frequency bands. Further, the audio values may be converted (e.g. at 504) onto a logarithmic scale, such as in the decibel domain. It is possible to select between a coarse quantization step (e.g., 1.25 dB to 6 dB) for the elevation and/or the azimuth.

The audio values along the different positions of the unit sphere 1 may be subjected to differentiation. For example, a differential audio value 105*a*' at a particular discrete position of the unit sphere 1 may be obtained by subtracting the audio value at the particular discrete position for an audio value of an audio adjacent discrete position (which may be an already differentiated discrete position). A predetermined path may be performed for differentiating the different audio values. For example, it may be that a particular first point is not provided differentially (e.g., the south pole) while all the remaining differentiations may be performed along a predefined path. In examples, sequences may be defined which may be the same sequences for the prediction. In some examples, it is possible to separate the frequency of the audio signal according to different frequency bands, and to perform a prediction for each frequency band.

It is to be noted that the predictor block 110 is in general inputted by the preprocessed audio signal 102, and not by the differentiation residual 105*a*'. Subsequently, the prediction residual generator 120 will generate the prediction residual values 122.

The techniques above may be combined with each other. For a first frequency band (e.g., the lowest frequency band) may be obtained by differentiating from adjacent discrete positions of the same frequency, while for the remaining frequencies (e.g., higher frequencies) it is possible to perform the differentiation from the immediately preceding adjacent frequency band.

Prediction at the Encoder and at the Decoder

A description of the prediction as at the predictor block 110 of the encoder and of the predictor block 210 of the decoder, or of the prediction as carried out at step 510 is now discussed.

It is noted that, when the prediction is performed at the encoder, the input is the preprocessed audio signal 102.

A prediction of the audio values along the entire unit sphere 1 may be performed according to a plurality of prediction sequences. In examples, there may be performed at least one initial prediction sequence and at least one subsequent prediction sequence. The at least one initial prediction sequence (which can be embodied by two initial prediction sequences 10, 20) may extend along a line (e.g. a meridian) of adjacent discrete positions, by predicting audio values based on the audio values of the immediately preceding audio values in the same initial prediction sequence. For example, there may be at least a first sequence 10 (which may be a meridian initial prediction sequence) which extends from the south pole 2 towards the north pole 4, along the at least one meridian. Prediction values may therefore be propagated along the reference meridian line (azimuth=0°). It will be shown that, at the south pole 2 (starting position of the first sequence) a non-predicted value may be inserted, but the subsequent prediction values are propagated through the meridian towards the north pole 4.

A second initial prediction sequence 20 may be defined along the equatorial line. Here, the line of adjacent discrete positions is formed by the equatorial line (equatorial circumference) and the audio values are predicted according to a predefined circumferential direction, e.g., from the minimum positive azimuth (closest to 0°) towards the maximum azimuth (closest to 360°). Notably, the second sequence 20 starts with a value at the intersection of the predicted meridian line (predicted at the first sequence 10) and the equatorial line. That position is the starting position 20*a* of the second sequence 20 (and may be the value with azimuth 0° and elevation 0°). After the second prediction sequence 20, therefore, at least one discrete position for the at least one meridian line (e.g. reference meridian) and at least one discrete position for each parallel line is performed.

At least one subsequent prediction sequence 30 may include, for example, a third sequence 30 for predicting discrete positions in the northern hemisphere, between the equatorial line and the north pole 4. A fourth sequence 40 may predict positions in the southern hemisphere, between the equatorial line and the south pole 2 (the already predicted positions in the meridian line as predicted in the second sequence 20 are not generally not predicted in the subsequent prediction sequences 30, 40).

Each of the subsequent prediction sequences (third prediction sequence 30, fourth prediction sequence 40) may be in turn subdivided into a plurality of subsequences. Each subsequence may move along one parallel line adjacent to a previously predicted parallel line. For example, FIG. 2 shows a first subsequence 31, a second subsequence 32 and other subsequences 33 of the third sequence 30 in the northern hemisphere. As can be seen, each of the subsequences 31, 32, 33 moves along one parallel line and has a circumferential length smaller than that of the preceding parallel line (i.e. the closer the subsequence is to the north pole, the less the number of discrete positions in the parallel, the less audio values are to be predicted). The first subsequence 31 is performed before the second subsequent 32, which in turn is performed before the immediately adjacent subsequence of the third sequence 30, moving towards the north pole 4 from the equatorial line. Each subsequence (31, 32, 33) is associated with a particular elevation (since it only predicts positions in one single parallel line), and moves along increasing azimuthal angles. Each subsequence (31, 32, 33) is so that an audio value is predicted based on at least the audio value of the discrete position immediately before in the same subsequence (that audio values shall already have been predicted) and audio values of the adjacent immediately previous predicted parallel line. Each subsequence 31, 32, 33 starts from a starting position (31*a*, 32*a*, 33*a*), and propagates along a predefined circumferential direction (e.g., from the azimuthal angle closest to 0 towards the azimuthal angle closest to 360°). The starting position (31*a*, 32*a*, 33*a*) may be in the reference meridian line, which has been predicted at the meridian initial prediction sequence 10. By virtue of the fact that the equatorial line has already been predicted in the second sequence 20, the first subsequence 31 of the third sequence 30 may be predicted also by relying on the already predicted audio values in the audio discrete positions at the equatorial line. For this reason, the audio values predicted in the second sequence 20 are used for predicting the first subsequence 31 of the third sequence 30. Therefore, the prediction carried out in the first subsequence 31 of the third sequence 30 is different from the second sequence 20 at the equatorial initial prediction sequence: in the second prediction sequence 20 the prediction has only been based on audio values in the equatorial line, while the predictions at the first subsequences 31 may be based not only on already predicted audio values in the same parallel line, but also by previously predicting audio values in the equatorial line.

Since the equatorial line (circumference) is longer than the parallel line on which the first subsequence 31 is processed, there is not an exact correspondence between the discrete positions in the parallel line in which the first subsequence 31 is carried out and the discrete positions in the equatorial line (i.e. the discrete positions of the equatorial line and of the parallel line are misaligned with each other). However, it has been understood that it is possible to interpolate the audio values of the equatorial line to reach an interpolated version of the equatorial line, with the same number of discrete positions of the parallel line.

The same is repeated, parallel line by parallel line, for the remaining subsequences of the same hemisphere. In some examples:

1) Each subsequence (31, 32, 33) of the third subsequence 30 may start from a starting position (31*a*, 32*a*, 33*a*) in the reference meridian line, which has already been predicted in the meridian initial prediction sequence 10;
2) After the already-predicted starting position (31*a*, 32*a*, 33*a*), each determined discrete position of each subsequence (31, 32, 33), is predicted by relying on:
   a. the previously predicted immediately preceding discrete position in the same subsequence
   b. (in some cases, also from the already predicted second immediately audio value in the same determined discrete position, which is adjacent to the immediately preceding discrete position, but is not adjacent to the determined discrete position)
   c. an adjacent interpolated version of audio values in the immediately preceding parallel line
   d. (in some cases, also from the already predicted audio value in the same determined discrete position, but obtained at a previous frequency band).

While the second sequence 30 moves from the equatorial line towards the north pole 4 propagating audio values in the northern hemisphere, the fourth sequence 40 moves from the equatorial line towards the south pole 2 propagating audio values in the southern hemisphere. Apart from that, the third and the fourth sequences 30 and 40 are analogous with each other.

Figure 6:
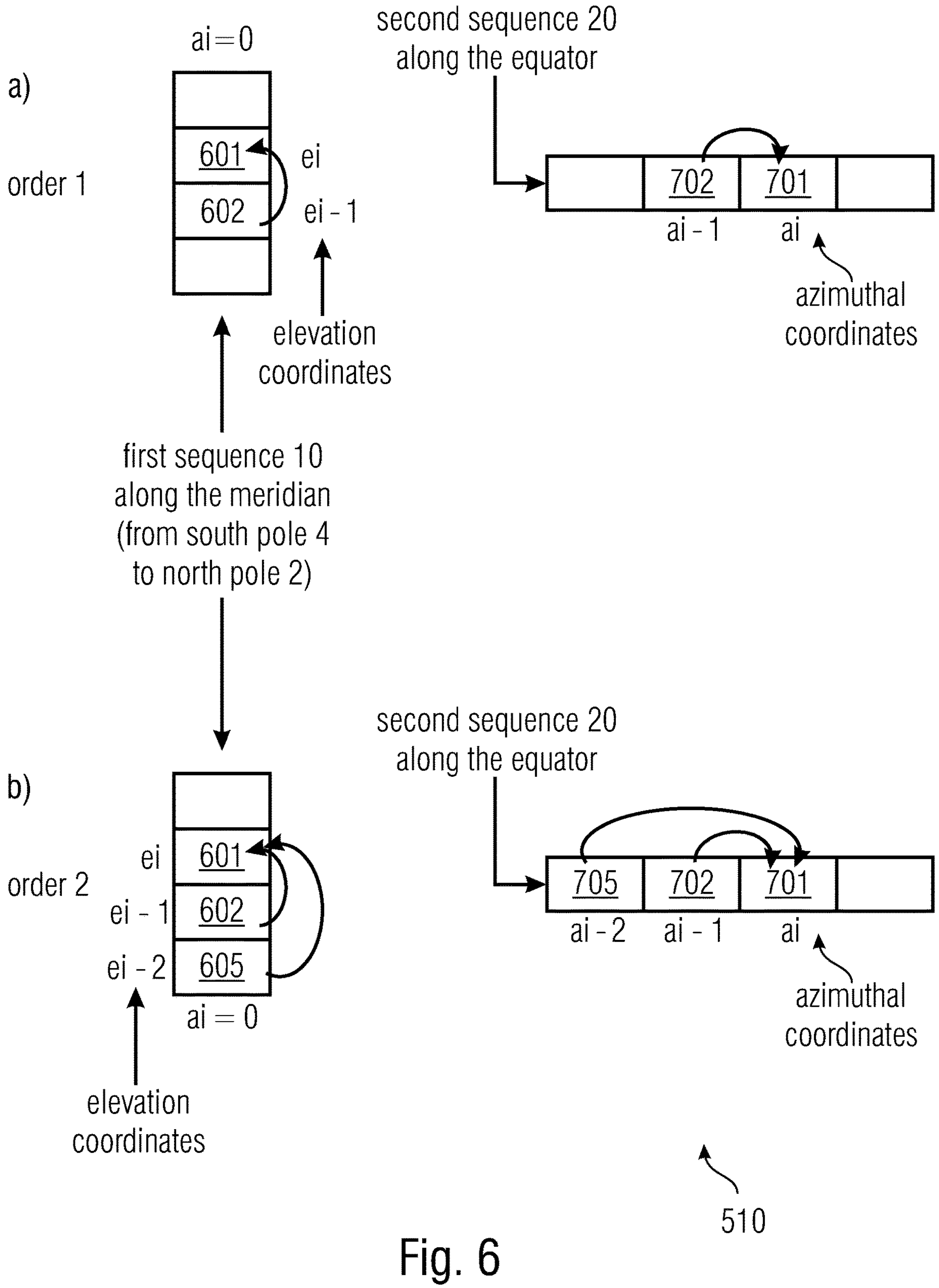
FIGS. 6 and 7 shows examples of predictions.
Figure 7:
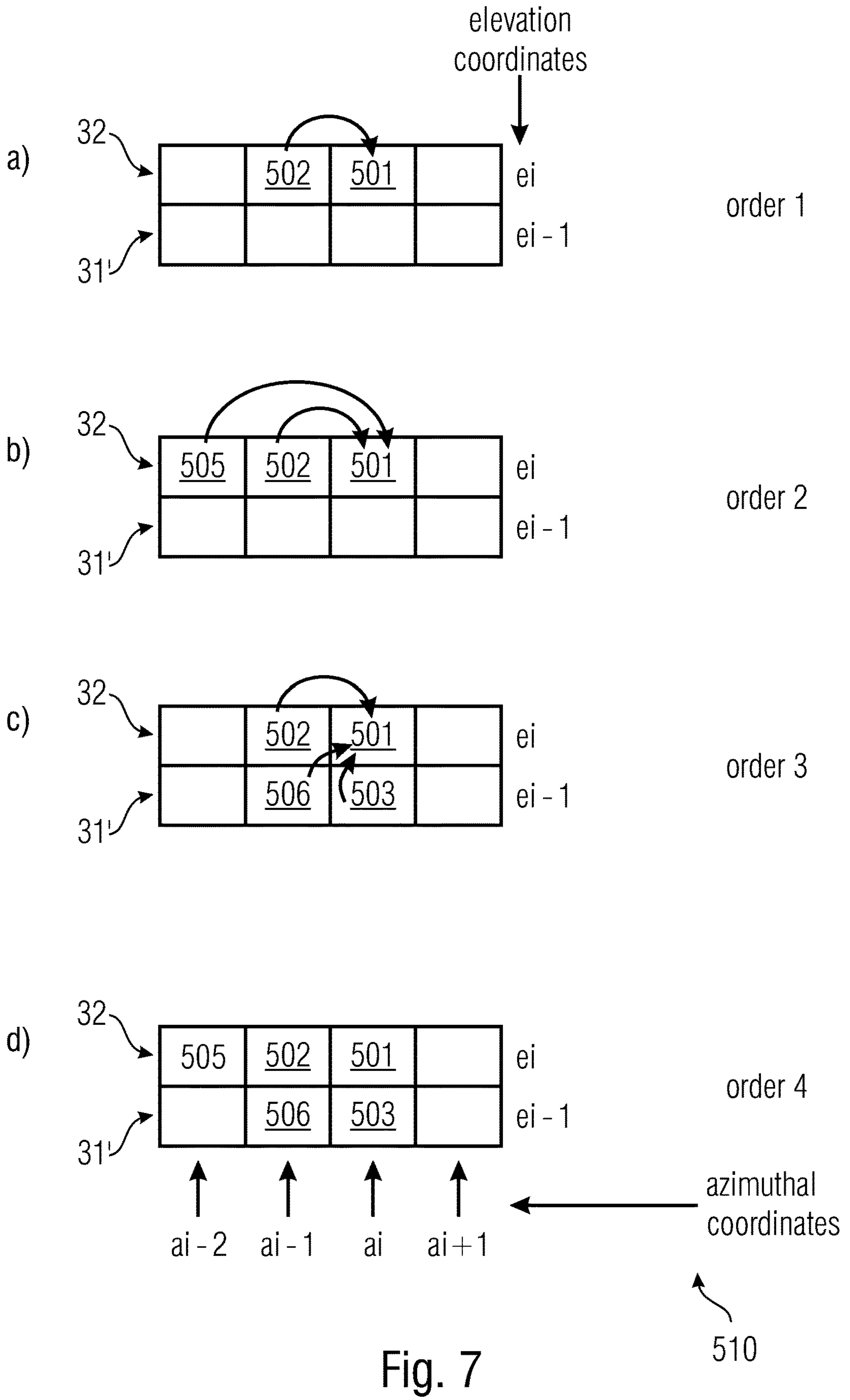

Different orders of prediction may be defined. FIGS. 6 and 7 show some examples thereof. With reference to the first sequence 10 and the second sequence 20, there may be defined a first order (according to which a specific discrete position is predicted from the already predicted audio value at the position which immediately precedes, and is adjacent to, the currently predicted discrete position). According to a second order, a specific discrete position is predicted from both:

1) a first already predicted audio value at the position which immediately precedes, and is adjacent to, the currently predicted discrete position;
2) a second already predicted audio value at the position which immediately precedes, and is adjacent to, discrete position of the first already predicted audio value.

An example is provided in FIG. 6. In section a) of FIG. 6 the first order for the first sequence 10 and the second sequence 20 is illustrated:

1) The first sequence 10 moves along the reference meridian with azimuth index ai=0 and elevation index moving from pole to pole:
   a. The audio value to be predicted at the discrete position 601 (having elevation index ei) is obtained from only:
      i. The already predicted audio value at the adjacent position 602 having elevation index ei−1
2) The second sequence 20 moves along the equator, with azimuth moving from the starting point 20*a* (ei=0, ai=0) and elevation index moving along the equator:
   a. The audio value to be predicted at the discrete position 701 (having elevation index ei=0 and azimuth index ai) is obtained from only:
      i. The already predicted value audio value at the adjacent position 702 having azimuth index ai−1.

Let us now examine the first and second sequences 10 and 20 according to the second order, illustrated section b) of FIG. 6:

1) The first sequence 10 moves along the reference meridian with azimuth index ai=0 and elevation index ei moving from pole to pole:
   a. The audio value to be predicted at the discrete position 601 (having elevation index ei and azimuth index ai=0) is predicted from only both:
      i. The already predicted audio value at the first position 602 (having elevation index ei−1 and azimuth index ai=0) adjacent to the position 601 currently processed; and
      ii. The already predicted audio value at the second position 605 (having elevation index ei−2 and azimuth index ai=0) adjacent to the first position 602.
   b. The prediction value may be an identity prediction, i.e. pred_v[ei+1]=cover[ei−1][0] (where "cover" refers to the value of the audio signal 101 or 102 before prediction);
2) The second sequence 20 moves along the equator, with azimuth a1 moving from the starting point 20*a* (ei=0, ai=0) and elevation index ei=0:
   a. The audio value to be predicted at the discrete position 701 (having elevation index ei=0 and azimuth index ai) is predicted from only both:
      i. The already predicted value audio value at the first position 702 (having elevation index ei=0 and azimuth index ai−1) adjacent to the position 601 currently processed; and
      ii. The already predicted value audio value at the adjacent position 705 (having elevation index ei=0 and azimuth index ai−2) adjacent to the second position.ended
   b. The prediction may be so that the predicted value pred_v is obtained as pred_v[ei][0]=2*cover[ei−1][0]−cover[ei−2][0].

Let us now examine the third and fourth sequences 30 and 40 in FIG. 7 (reference is made to the third sequence, and in particular to the second subsequence 32 performed after the second subsequence 31.

For example, at least one of the following pre-defined orders may be defined (the symbols and reference numerals are completely generic, only for the sake of understanding):

1) A first order (order 1, shown in section a) of FIG. 7) according to which the audio value in the position 501 (elevation ei, azimuth ai) is predicted from:
   a. the previously predicted audio value in the immediately adjacent discrete position 502 (ei, ai−1) in the same subsequence 32; and
   b. the interpolated audio value in the adjacent position 503 in the interpolated version 31' (ei, ai−1) of the previously predicted parallel line 31;
   c. e.g. according to the formula pred_v=cover[ei−1][0] (e.g. identity prediction);
2) a second order (order 2, shown in section b) of FIG. 7) (using the immediately previous elevation and the two immediately previous azimuths) according to which the audio value to be predicted in the position 501 (in the subsequence 32) is obtained from:
   a. the predicted audio value in the adjacent discrete position 502 in the same subsequence 32;
   b. one first interpolated audio value in the position 505 adjacent to the position 502 in the same subsequence;

c. e.g. according to the formula pred_v=2*cover[ei−1][0]−cover[ei−2][0];

3) a third order (order 3, shown in section c) of FIG. 7) (using both the immediately previous elevation value, the immediately previous azimuth value) according to which the audio value to be predicted in the position 501 is obtained from:

a. the previously predicted audio value in the adjacent discrete position 502 in the same subsequence 32; and b. the interpolated audio value in the adjacent position 503 in the interpolated version 31' of the previously predicted parallel line 31';

c. one second interpolated audio value in the position 506 adjacent to the position 503 of the first interpolated audio value and adjacent to the audio value in the adjacent discrete position 502 in the same subsequence 32 of the value 501 to be predicted;

d. e.g. according to the formula $\hat{v}_{e_i,a_i}=v_{e_i,a_{i-1}}+\tilde{v}_{e_{i-1},a_i}-\tilde{v}_{e_{i-1},a_{i-1}}$ where $v_{e_i,a_{i-1}}$ is the predicted value at position 502, $\tilde{v}_{e_{i-1},a_{i-1}}$ is the predicted interpolated value at 503, and $\tilde{v}_{e_{i-1},a_{i-1}}$ is the predicted interpolated value at 506.

4) a fourth order (order 4, shown in section d) of FIG. 7) (using the immediately previous elevation value, two immediately previous azimuth values (ai−1 and ai−2)) according to which the audio value to be predicted in the position 501 (in the subsequence 32) is obtained from:

a. the predicted audio value in the adjacent position 502 in the same subsequence 32;

b. one first interpolated audio value in the adjacent position 505 adjacent to the position 502 in the same subsequence 32;

c. one first interpolated audio value in the adjacent position 503 in the interpolated version 31' of the previously predicted parallel line 31;

d. one second interpolated audio value in the position 506 adjacent to the position 503 of the first interpolated audio value and also adjacent to the position 502 adjacent in the same subsequence e. e.g. according to the formula $\hat{v}_{e_i,a_i}=v_{e_i,a_{i-1}}+\tilde{v}_{e_{i-1},a_i}-\tilde{v}_{e_{i-1},a_{i-1}}$ where $v_{e_i,a_{i-1}}$ is the predicted value at position 502, $v_{e_i,a_{i-2}}$ is the predicted value at position 505, $\tilde{v}_{e_{i-1},a_{i-1}}$ is the predicted interpolated value at 503, and $\tilde{v}_{e_{i-1},a_{i-1}}$ is the predicted interpolated value at 506

Even if reference has been made to subsequence 32, this is general for the second sequence 30 and the fourth sequence 40.

The type of ordering may be signalled in the bitstream 104. The decoder will adopt the same prediction signalled in the bitstream.

The prediction orders discussed below may be selectively chosen (e.g., by block 109*a* and or at step 509) for each prediction sequence (e.g. one selection for the initial prediction sequences 10 and 20, and one selection for the subsequent prediction sequences 30 and 40).

For example, it may be signalled that the first and second initial sequences 10 and 20 are to be performed with order 1 or with order 2, and there may be signalled the the third and fourth sequences 30 and 40 are to be performed with order selected between 1, 2, 3, and 4. The decoder will read the signalling and will perform the prediction according to the selected order(s). It is noted that the orders 1 and 2 (FIG. 7, sections a) and b)) do not require the prediction to be also based on the preceding parallel. The prediction order 5 may be the one illustrated in FIGS. 1*a*-1*c* and 2*a*.

Basically, the encoder may select (e.g., at block 109*a* and or at step 509), e.g. based on simulations, to perform the at least one subsequent prediction sequence (30, 40) by moving along the parallel line and being adjacent to a previously predicted parallel line, such that audio values along a parallel line being processed are predicted based on only audio values of the adjacent discrete positions in the same subsequence (31, 32, 33). The decoder will follow the encoder's selection based on the signalling the bitstream 104, and will perform the prediction as requested, e.g. according to the order selected.

It is noted that, after the prediction carried out by the predictor block 210, the predicted values 212 may be added (at adder 220) with the prediction residual values 222, so as to obtain signal 202.

With reference to the decoder 200 or 200*a*, a prediction section 210' may be considered to include the predictor 210 and an adder 200, so as to add the residual value (or the integrated signal 105*a*' generated by the integrator 205*a*) to the predicted value 212. The obtained value may then be postprocessed.

With reference to the above, it is noted that the first sequence 10 may start (e.g. at the south pole) with a value obtained from the bitstream (e.g. the value of at the south pole). In the encoder and/or in the decoder, this value may be non-residual.

Residual Generator and Bitstream Writer at the Encoder

With reference to FIGS. 1*d*-1*f*, a subtraction may be performed by the prediction residual generator 120 by subtracting, from the signal 102, the predicted values 112, to generate prediction residual values 122.

With reference to FIGS. 1*a*-1*c*, a subtraction may be performed by the prediction residual generator 120 by subtracting, from the signal 105*a*', the predicted values 112, to generate prediction residual values 122.

A bitstream writer may write the prediction residual values 122 onto the bitstream 104. The bitstream writer may, in some cases, encode the bitstream 104 by using a single-stage encoding. In examples, more frequent predicted audio values (e.g. 112), or processed versions thereof (e.g. 122), are associated with codes with lower length than the less frequent predicted audio values, or processed versions thereof.

In some cases, it is possible to perform a two-stage encoding.

Bitstream Reader at the Decoder

The reading to be performed by the bitstream reader 230 substantially follows the rules described for encoding the bitstream 104, which are therefore not repeated in detail.

The bitstream reader 230 may, in some cases, read the bitstream 104 using a single-stage decoding. In examples, more frequent predicted audio values (e.g. 112), or processed versions thereof (e.g. 122), are associated with codes with lower length than the less frequent predicted audio values, or processed versions thereof.

In some cases, it is possible to perform a two-stage decoding.

Postprocessing and Rendering at the Decoder

Some postprocessing may be performed onto the audio signal 201 or 202 to obtain a processed versions 201 of the audio signal to be rendered. A postprocessor 205 may be used. For example, the audio signal 201 may be recomposed recomposing the frequency bands.

Further, the audio values may be reconverted from the logarithmic scale, such as in the decibel domain, to a linear domain.

The audio values along the different positions of the unit sphere 1 (which may be defined as a differential values) may be recomposed, e.g. by adding the value of the immediately preceding adjacent discrete position (apart from a first value, e.g. at the south pole, which may be not differential). An predefined ordering is defined, which is the same taken by the preprocessor 205 of the encoder 200 (the ordering may be the same as the one taken for predicting, e.g., at first, the first sequence 10, then the second sequence 20, then the third sequence 30, and finally the fourth sequence 40).

Example of Decoding

It is here in concrete how to carry out the present examples, in particular from the point of view of the decoder 200.

Directivity is used to auralize the Directivity property of Audio Elements. To do this, the Directivity tool is comprised of two components: the coding of the Directivity data, and the rendering of the Directivity data. The Directivity is represented as a number of Covers, where each Cover is arithmetically coded. The rendering of the Directivity is done by checking to see which render items (RIs) use Directivity, taking the filter gain coefficients from the Directivity, and applying an equalizer (EQ) to the metadata of the RI.

Here below, when it is referred to "points", it is referred to the "discrete positions" defined above.

Data Elements and Variables:

| | |
|---|---|
| covers | This array holds all decoded directivity Covers |
| dbStepIdx | This is the index of the decibel quantization range. |
| dbStep | This number is the decibel step that the values have been quantized to. |
| intPer90 | This integer is the interval of azimuth points per 90 degrees around the equator of the Cover. |
| elCnt | This integer is the number of elevation points on the Cover. |
| aziCntPerEl | Each element in this array represents the number of azimuth points per elevation point. |
| coverWidth | This number is the maximum azimuth points around the equator. |
| minPosVal | This number is the minimum possible decibel value that could be coded. |
| maxPosVal | This number is the maximum possible decibel value that could coded. |
| minVal | This number is the lowest decibel value that is actually present in the coded data. |
| maxVal | This number is the lowest decibel value that is actually present in the coded data. |
| valAlphabetSize | This is the number of symbols in the alphabet for decoding. |
| predictionOrder | This number represents the prediction order for this Cover. This influences how the Cover is reconstructed using the previous residual data, if present. |
| cover | This 2d matrix represents the Cover for a given frequency band. The first index is the elevation, and the second index is the azimuth. The value is the dequantized decibel value for that azimuth and elevation. Note, the length of the azimuth points is variant. |
| coverResiduals | This 2d matrix represents the residual compression data for the Cover. It mirrors the same data structure as cover, however the value is the residual data instead of the decibel value itself. |
| freq | This is the final dequantized frequency value in Hertz. |
| freqIdx | This is the index of the frequency that needs to be dequantized to retrieve the original value. |
| freq1oIdxMin | This is the minimum possible index in the octave quantization mode. |
| freq1oIdxMax | This is the maximum possible index in the octave quantization mode. |
| freq3oIdxMin | This is the minimum possible index in the third octave quantization mode. |
| freq3oIdxMax | This is the maximum possible index in the third octave quantization mode. |
| freq6oIdxMin | This is the minimum possible index in the sixth octave quantization mode. |
| freq6oIdxMax | This is the maximum possible index in the sixth octave quantization mode. |

Definitions

| | |
|---|---|
| Sphere Grid | A quasi-uniform grid of points upon the surface a unit sphere. |
| $v_{e_i, a_i}$ | Where v is the current Cover, $e_i$ is the elevation index, and $a_i$ is the azimuth index. |
| $\hat{v}_{e_i, a_i}$ | Where $\hat{v}$ is the current Cover's fixed linear predictor, $e_i$ is the elevation index, and $a_i$ is the azimuth index. |
| $\tilde{v}_{e_i, a_i}$ | Where $\tilde{v}$ is the current Cover that has been circularly interpolated, and where $e_i$ is the elevation index, and where $a_i$ is the azimuth index. |
| $n_{e_i}$ | Where n is the number of azimuth points in the Sphere Grid per elevation, and where $e_i$ is the elevation index. |

Decoding Process

Once the directivity payload is received by the renderer, before the Directivity Stage initialization, the decoding process begins. Each Cover has an associated frequency; direcFreqQuantType indicates how the frequency is decoded, i.e. determining the width of the frequency band, which is done in readQuantFreq( ). The variable dbStep determines the quantized step sizes for the gain coefficients; its value lies within a range between 0.5 and 3.0 with increments of 0.5. intPer90 is the number of azimuth points around a quadrant of the equator and is the key variable used for the Sphere Grid generation (This integer is the number of elevation points on the Cover). direcUseRawBasline determines which of two decoding modes is chosen for the gain coefficients. The available decoding modes either the "Baseline Mode" or the "Optimized Mode". The baseline mode simply codes each decibel index arithmetically using a uniform probability distribution. Whereas, the optimized mode uses residual compression in conjunction with an adaptive probability estimator alongside five different prediction orders. Finally, after the completion of decoding, the directivities are passed to the Scene State where other Scene Objects can refer to them.

Sphere Grid Generation

The Sphere Grid determines the spatial resolution of a Cover, which could be different across Covers. The Sphere Grid of the Cover has a number of different points. Across the equator, there are at least 4 points, possibly more depending on the intPer90 value. At the north and south poles, there is exactly one point. At different elevations, the number of points is equal or less than the number of points across the equator, and is decreasing as the elevation approaches the poles. Upon each elevation layer, the first azimuth point is 0°, creating a line of evenly spaced points from the south pole, to the equator, and, finally, to the north pole. This property is not guaranteed for the rest of the azimuth points across different elevations. The following is a description in pseudocode format:

generateSphereGrid(intPer90)

```
{
  piOver180 = acos(−1) / 180;          // 1 degree
  degStep = 90 / intPer90;          // intPer90 is the number of azimuth points around a
quadrant of the equator
  elCnt = 2 * intPer90 + 1;          // (integer) number of elevation points on the Cover
  azCnt[elCnt] = { 0 };
  coverWidth = 4 * intPer90; // maximum number of azimuth points (at equator)
  for (ei = 0; ei < elCnt; ei++)
  {
    elAng = (ei − intPer90) * degStep;
    elLen = cos(elAng * piOver180);
    azCnt[ei] = max(round(elLen * 4 * intPer90), 1);
  }
  return elCnt, aziCntPerEl, coverWidth
}
```

Baseline Mode

The baseline mode uses a range decoder with a uniform probability distribution to decode quantized decibel values. The maximum and minimum possible values (i.e., maxPosVal, minPosVal) that can be stored are −128.0 and 127, respectively. The alphabet size can be found using dbStep and the actual maximum and minimum possible value (maxVal, minVal). After decoding the decibel, a simple rescaling is done to find the actual dB value. This can be seen in Table.

Optimized Mode

The optimized mode decoding uses a sequential prediction scheme, which traverses the Cover in a special order. This scheme is determined by predictionOrder, where its value can be an integer between 1 and 5 inclusive. predictionOrder dictates which linear prediction order (1 or 2) to use. When predictionOrder==1||predictionOrder==3, the linear prediction order is 1 and when predictionOrder==2||predictionOrder==4, the linear prediction order is 2. The traversal is composed of four different sequences:

The first sequence goes vertically, from the value at the South Pole to the North Pole, all with azimuth 0. The first value of the sequence (coverResiduals[0][0]), at the South Pole is not predicted. This value serves as the basis in which the rest of the values are predicted from.

This prediction uses either a linear prediction of order 1 or 2. Using a prediction order of 1 uses the previous elevation value, where a prediction order of 2 uses the two previous elevation values as a basis for prediction.

The second sequence goes horizontally, at the equator, from the value next to the one at azimuth 0 degrees (which was already predicted during the first sequence), until the value previous to it at azimuth close to 360 degrees. The values are predicted from previous values also using linear prediction of order 1 or 2. Similarly to sequence one, using a prediction order of 1 uses the previous azimuth value, where using a prediction of 2 uses the previous two azimuth values as a basis prediction.

The third sequence goes horizontally, in order for each elevation, starting from the one next to the equator towards the North Pole until the one previous to the North Pole. Each horizontal subsequence starts from the value next to the one at azimuth 0 degrees (which was already predicted during the first sequence), until the value previous to it at azimuth close to 360 degrees. When (predictionOrder==1||predictionOrder==2||predictionOrder==3||predictionOrder==4) the values are predicted from previous values using either linear prediction of order 1 or 2, as explained above. Furthermore, when (predictionOrder==3||predictionOrder==4), in addition to the previous values on the current Cover, the values are also used from the previously predicted elevation. Since the number of points upon the Sphere Grid $n_{e_{i-1}}$ at the previously predicted elevation $e_{i-1}$ is different from the number of points $n_{e_i}$ at the currently predicted elevation $e_i$, the number of azimuth points do not match across the elevations in the Sphere Grid. Therefore, the points $v_{e_{i-1},a_i}$, at the previously predicted elevation $e_{i-1}$ are circularly interpolated to produce $n_{e_i}$ new points, where $a_i$ is azimuth index and v is a 2d vector representing the Cover. For example, if the number of points at the current elevation is 24, and the number of points at the previous elevation is 27, they are circularly interpolated to produce 24 new points. Interpolation is linear to preserve monotonicity. For a given point value to be predicted $v_{e_i,a_i}$, the previous point value horizontally $v_{e_i,a_{i-1}}$ and the corresponding previous point value $\hat{v}_{e_{i-1},a_{i-1}}$ and current point value $\hat{v}_{e_{i-1},a_i}$ on the circularly interpolated new points (which are derived from the previous elevation level) are used as regressors to create a predictor with 3 linear prediction coefficients. A fixed linear predictor is used, i.e. $\hat{v}_{e_i,a_i}=v_{e_i,a_{i-1}}+\tilde{v}_{e_{i-1},a_i}-\tilde{v}_{e_{i-1},a_{i-1}}$, which predicts perfect 2D linear slopes in dB domain.

The fourth sequence also goes horizontally, in order for each elevation, exactly like the third sequence, however starting from the one next to the equator towards the South Pole until the one previous to the South Pole.

The following pseudocode describes the aforementioned algorithm:

```
unpredict(predOrder, coverRes, prevCover)
{
  if (predOrder == 5) {
    for (ei = 0; ei < elCnt; ei++) {
      for (ai = 0; ai < aziCntPerEl[ei]; ai++) {
        i = ei * coverWidth + ai;
        cover[ei][ai] = coverRes[ei][ai] + prevCover[ei][ai];
      }
    }
    return;
  }
```

-continued

```
// copy the original value at the South pole,
// coverRes[0], which is not predicted
cover[0] = coverRes[0];
// predict vertically, from the one after the
// South pole to the North pole, at azimuth 0 FIRST SEQUENCE
for (int ei = 1; ei < elCnt; ++ei) {
  if ((predOrder == 1) || (ei == 1) || (pred Order == 3)) {
    pred_v = cover[ei - 1][0];
  }
  else if ((predOrder == 2) || (predOrder == 4)) {
    pred_v = 2 * cover[ei - 1][0] - cover[ei - 2][0];
  }
  cover[ei][0] = coverRes[ei][0] + pred_v;
  // always use true order 1 or true order 2 horizontal prediction at the equator
  if (((predOrder == 3) || (predOrder == 4)) && (ei != intPer90)) {
    continue;
  }
  // predict horizontally, from azimuth 0 to the maximum azimuth (SECOND SEQUENCE)
  for (int ai = 1; ai < aziCntPerEl[ei]; ++ai) {
    if ((predOrder == 1) || (ai == 1) || (predOrder == 3)) {
      pred_h = cover[ei][ai - 1];
    }
    else if ((predOrder == 2) || (predOrder == 4)) {
      pred_h = 2 * cover[ei][ai - 1] - cover[ei][ai - 2];
    }
    cover[ei][ai] = coverRes[ei][ai] + pred_h;
  }
}
if ((predOrder == 3) || (predOrder == 4)) {                    (THIRD
SEQUENCE)
  cResample[coverWidth] = { 0 };
  // predict horizontally for each elevation,
  // from the one following the equator to the South pole
  for (int ei = intPer90 - 1; ei >= 1; --ei) {
    input = cover;
    start = (ei + 1) * coverWidth;
    count = aziCntPerEl[ei + 1];
    newCount = aziCntPerEl[ei];
    output = cResample;
    circularResample(input, start, count, newCount, output);
    for (int ai = 1; ai < aziCntPerEl[ei]; ++ai) {
      pred_h = cover[ei][ai - 1] + (cResample[ai] - cResample[ai - 1]);
      cover[ei][ai] = coverRes[ei][ai] + pred_h;
    }
  }
  // predict horizontally for each elevation,
  // from the one following the equator to the North pole (FOURTH SEQUENCE)
  for (int ei = intPer90 + 1; ei < elCnt - 1; ++ei) {
    input = cover;
    start = (ei - 1) * coverWidth;
    count = aziCntPerEl[ei - 1];
    newCount = aziCntPerEl[ei];
    output = cResample;
    circularResample(input, start, count, newCount, output);
    for (int ai = 1; ai < aziCntPerEl [ei]; ++ai) {
      pred_h = cover[ei][ai - 1] + (cResample[ai] - cResample[ai - 1]);
      cover[ei][ai] = coverRes[ei][ai] + pred_h;
    }
  }
}
}
```

Stage Description

The stage iterates over all RIs in the update thread, checks whether Directivity can be applied, and, if so, the stage takes the relative position between the Listener and the RI, and queries the Directivity for filter coefficients. Finally, the stage applies these filter gain coefficients to the central EQ metadata field of the RI, to be finally auralized in EQ stage.

Update Thread Processing

Directivity is applied to all RIs with a value of true in the data elements of objectSourceHasDirectivity and loudspeakerHasDirectivity (and by secondary RIs derived from such RIs in the Early Reflections and Diffraction stages) by using the central EQ metadata field that accumulates all EQ effects before they are applied to the audio signals by the EQ stage. The listener's relative position in polar coordinates to the RI is needed to query the Directivity. This can be done, e.g. using Cartesian to Polar coordinate conversion, homogenous matrix transforms, or quaternions. In the case of secondary RIs, their relative position for their parents must be used to correctly auralize the Directivity. For consistent frequency resolution, the directivity data is linearly interpolated to match the EQ bands of the metadata field, which can differ from the bitstream representation, depending on the bitstream compression configuration. For each frequency band, directiveness (available from objectSourceDirectiveness or loudspeakerDirectiveness) is applied according to the formula $C_{eq}$=exp(d log m), where d is the directiveness value and m is the interpolated magnitude derived from the Covers adjacent to the requested frequency band, and $C_{eq}$ is the coefficient used for the EQ.

Audio Thread Processing

The directivity stage has no additional processing in the audio thread. The application of the filter coefficients is done in the EQ stage.

A Bitstream Syntax

In environments that need byte alignment, MPEG-I Immersive audio configuration elements or payload elements that are not an integer number of bytes in length are padded at the end to achieve an integer byte count. This is indicated by the function ByteAlign( )

Renderer Payloads Syntax (to be Inserted in the Bitstream 104)

TABLE 1

Syntax of payloadDirectivity( )

| Syntax | No. of bits | Mnemonic |
|---|---|---|
| payloadDirectivity( ) | | |
| { | | |
| directivitiesCount; | 8 | uimsbf |
| for (int i = 0; i < directivitiesCount; i++) { | | |
| directivityId; | 16 | uimsbf |
| directivityCodedLength; | 32 | uimsbf |
| coverSet( ); | directivityCodedLength | bslbf |
| } | | |
| } | | |

directivitiesCount: This integer represents the number of source directivities that are present in the payload directivityId: This integer is the identifier for this source directivity directivityCodedLength; This integer represents the size of the coded source directivity data in Bytes

TABLE 2

Syntax of coverSet( )

| Syntax | No. of bits | Mnemonic |
|---|---|---|
| coverSet( ) | | |
| { | | |
| direcCoverCount; | 6 | uimsbf |
| direcFreqQuantType; | 2 | uimsbf |
| for (int i = 0; i < direcCoverCount; i++) { | | |
| covers[i] = directivityCover( ); | | vlclbf |
| } | | |
| frdFinish( ); | | vlclbf |
| } | | |

direcCoverCount: This integer represents the number of covers that are available direcFreqQuantType: This integer determines the quantization type of the frequency for every cover

TABLE 3

Syntax of directivityCover( )

| Syntax | No. of bits | Mnemonic |
|---|---|---|
| directivityCover( ) | | |
| { | | |
| direcUseRawBaseline; | 1 | uimsbf |
| freq = readQuantFrequency( ); | | vlclbf |

TABLE 3-continued

Syntax of directivityCover( )

| Syntax | No. of bits | Mnemonic |
|---|---|---|
| dbStepIdx = frdReadUniform(12); | | vlclbf |
| dbStep = (dbStepIdx + 1) * 0.25; | | |
| intPer90 = frdReadUniform(45); | | vlclbf |
| intPer90 += 1; | | |
| minPosVal = round(−128.0 / dbStep); | | |
| maxPosVal = round(127.0 / dbStep); | | |
| posValCount = maxPosVal − minPosVal + 1; | | |
| elCnt, aziCntPerEl, coverWidth = generateSphereGrid(intPer90); | | |

TABLE 3-continued

Syntax of directivityCover( )

| Syntax | No. of bits | Mnemonic |
|---|---|---|
| if (direcUseRawBaseline) { | | |
| cover = rawCover( ); | | vlclbf |
| } | | |
| else { | | |
| cover = optimizedCover( ); | | vlclbf |
| } | | |
| for (int ei = 0; ei < elCnt; ei++) { | | |
| for (int ai = 0; ai < aziCntPerEl[ei]; ai++) { | | |
| cover[ei][ai] *= dbStep; | | |
| } | | |
| } | | |
| } | | |

TABLE 4

Syntax of readQuantFrequency( )

| Syntax | No. of bits | Mnemonic |
|---|---|---|
| readQuantFrequency( ) | | |
| { | | |
| freq1oIdxMin = −5; | | |
| freq1oIdxMax = 4; | | |
| freq3oIdxMin = −17; | | |
| freq3oIdxMax = 13; | | |
| freq6oIdxMin = −34; | | |
| freq6oIdxMax = 26; | | |

TABLE 4-continued

| Syntax of readQuantFrequency( ) | | |
|---|---|---|
| Syntax | No. of bits | Mnemonic |
| if (direcFreqQuantType == 0) { | | |
| alphaSize = freq1oIdxMax − freq1oIdxMin + 1; | | |
| freqIdx = frdReadUniform(alphaSize); | | vlclbf |
| freqIdx += freq1oIdxMin; | | |
| freq = 1000 * pow(2, freqIdx); | | |
| } | | |
| else if (direcFreqQuantType == 1) { | | |
| alphaSize = freq3oIdxMax − freq3oIdxMin + 1; | | |
| freqIdx = frdReadUniform(alphaSize); | | vlclbf |
| freqIdx += freq3oIdxMin; | | |
| freq = 1000 * pow(2, freqIdx / 3); | | |
| } | | |
| else if (direcFreqQuantType == 2) { | | |
| alphaSize = freq6oIdxMax − freq6oIdxMin + 1; | | |
| freqIdx = frdReadUniform(alphaSize); | | vlclbf |
| freqIdx += freq6oIdxMin; | | |
| freq = 1000 * pow(2, freqIdx / 6); | | |
| } | | |
| else { | | |
| freqIdx = frdReadUniform(24000); | | vlclbf |
| freq = freqIdx + 1; | | |
| } | | |
| } | | |

direcFreqQuantType: This integer determines the quantization type of the frequency for every cover

TABLE 5

| Syntax of rawCover( ) | | |
|---|---|---|
| Syntax | No. of bits | Mnemonic |
| rawCover( ) | | |
| { | | |
| minVal = frdReadUniform(posValCount); | | vlclbf |
| minVal += minPosVal; | | |
| maxVal = frdReadUniform(posValCount); | | vlclbf |
| maxVal += minPosVal; | | |
| valAlphabetSize = maxVal − minVal + 1; | | |
| for (int ei = 0; ei < elCnt; ei++) { | | |
| for (int ai = 0; ai < aziCntPerEl[ei]; ai++) { | | |
| cover[ei][ai] = frdReadUniform(valAlphabetSize); | | vlclbf |
| cover[ei][ai] += minVal; | | |
| } | | |
| } | | |
| } | | |

minVal: This number is the lowest decibel value that is actually present in the coded data minPosVal: This number is the minimum possible decibel value that could be coded valAlphabetSize: This is the number of symbols in the alphabet for decoding

TABLE 6

| Syntax of optimizedCover( ) | | |
|---|---|---|
| Syntax | No. of bits | Mnemonic |
| optimizedCover( ) | | |
| { | | |
| predictionOrder = frdReadUniform(5); | | vlclbf |
| predictionOrder += 1; | | |
| if (predictionOrder != 5) { | | |
| coverResiduals[0][0] = frdReadUniform (posValCount); | | vlclbf |
| } | | |
| minResidual = frdReadCompactUint(10); | | vlclbf |
| maxResidual = frdReadCompactUint(10); | | vlclbf |
| alph = maxResidual − minResidual + 1; | | |
| for (int ei = 0; ei < elCnt; ei++) { | | |
| for (int ai = 0; ai < aziCntPerEl[ei]; ai++) { | | |
| coverResiduals[ei][ai] = frdRead(alph); | | vlclbf |
| coverResiduals[ei][ai] += minResidual; | | |
| } | | |
| } | | |
| cover = unpredict(coverResiduals, predictionOrder, covers[−1]); | | |
| } | | |

Discussion

The new approach is composed of five main stages. The first stage generates a quasi-uniform covering of the unit sphere, using an encoder selectable density. The second stage converts the values to the dB scale and quantizes them, using an encoder selectable precision. The third stage is used to remove possible redundancy between consecutive frequencies, by converting the values to differences relative to the previous frequency, useful especially at lower frequencies and when using relatively coarse sphere covering. The fourth stage is a sequential prediction scheme, which traverses the sphere covering in a special order. The fifth stage is entropy coding of the prediction residuals, using an adaptive estimator of its distribution and optimally coding it using a range encoder.

A first stage of the new approach may be to sample quasi-uniformly the unit sphere 1 using a number of points (discrete positions), using further interpolation over the fine or very fine spherical grid available in the directivity file. The quasi-uniform sphere covering, using an encoder selectable density, has a number of desirable properties: there is elevation 0 present (the equator), at every elevation level present there is a sphere point at azimuth 0, and both determining the closest sphere point and performing bilinear interpolation can be done in constant time for a given arbitrary elevation and azimuth. The parameter controlling the density of the sphere covering is the angle between two consecutive points on the equator, the degree step. Because of the constraints implied by the desirable properties, the degree step must be a divisor of 90 degrees. The coarsest sphere covering, with a degree step of 90 degrees, corresponds to a total of 6 sphere points, 2 points at the poles and 4 points on the equator. On the other end, a degree step of 2 degrees corresponds to a total of 10318 sphere points, and 180 points on the equator. This sphere covering is very similar to the one used for the quantization of azimuth and elevation for DirAC direction metadata in IVAS, except that it is less constrained. In comparison, there is no requirement that the number of points at every elevation level other than at the equator is a multiple of 4, which was chosen in DirAC in order to ensure that there are sphere points at azimuths of 90, 180, and 270 degrees. In FIGS. 1*a*-1*f* this first stage is not shown, but it provides the audio signal 101.

A second stage may convert the linear domain values, which are positive, but are not limited to a maximum value of 1, into dB domain. Depending on the normalization convention chosen for the directivity (i.e., an average value of 1 on the sphere, a value 1 on the equator at azimuth 0, etc.), values can be larger than 1. The quantization is done linearly in the dB domain using an encoder selectable precision, typically using a quantization step size from very fine at 0.25 dB to very coarse at 6 dB. In FIGS. 1*a*-1*f* this second stage can be performed by the preprocessor 105 of the encoder 100, and its reverse function is performed by the postprocessor 205 of the decoder 200.

A third stage (differentiation) may be used to remove possible redundancy between consecutive frequencies. This is done by converting the values on the sphere covering for the current frequency to differences relative to values on the sphere covering of the previous frequency. This approach is especially advantageous at lower frequencies, where the variations across frequency for a given elevation and azimuth tend to be smaller than at high frequencies. Additionally, when using quite coarse sphere coverings, e.g., with a degree step of 22.5 degrees or more, there is less correlation available between neighboring consecutive sphere points, when compared to the correlation across consecutive frequencies. In FIGS. 1*a*-1*f* this third stage can be performed by the preprocessor 105 of the encoder 100, and its reverse function is performed by the postprocessor 205 of the decoder 200.

A fourth stage is a sequential prediction scheme, which traverses the sphere covering for one frequency in a special order. This order was chosen to increase the predictability of the values, based on the neighborhood of previously predicted values. It is composed of 4 different sequences 10, 20, 30, 40. The first sequence 10 goes vertically, e.g. from the value at the South Pole to the North Pole, all with azimuth 0°. The first value of the sequence, at the South Pole 2 is not predicted, and the rest are predicted from the previous values using linear prediction of order 1 or 2. The second sequence 20 goes horizontally, at the equator, from the value next to the one at azimuth 0 degrees (which was already predicted during the first sequence), until the value previous to it at azimuth close to 360 degrees. The values are predicted from previous values also using linear prediction of order 1 or 2. One option is to use fixed linear prediction coefficients, with the encoder selecting the best prediction order, the one producing the smallest entropy of the prediction error (prediction residual).

The third sequence 30 goes horizontally, in order for each elevation, starting from the one next to the equator towards the North Pole until the one previous to the North Pole. Each horizontal subsequence starts from the value next to the one at azimuth 0 degrees (which was already predicted during the first sequence), until the value previous to it at azimuth close to 360 degrees. The values are predicted from previous values using either linear prediction of order 1 or 2, or a special prediction mode using also the values available at the previously predicted elevation. Because the number of points $n_{e_{i-1}}$ at the previously predicted elevation $e_{i-1}$ is different from the number of points $n_{e_i}$ at the currently predicted elevation $e_i$, their azimuths do not match. Therefore, the points $v_{e_{i-1},a_i}$ at the previously predicted elevation $e_{i-1}$ are circularly interpolated to produce $n_{e_i}$ new points. For example, if the number of points at the current elevation is 24, and the number of points at the previous elevation is 27, they are circularly interpolated to produce 24 new points. Interpolation is usually linear to preserve monotonicity. For a given point value to be predicted $v_{e_i,a_i}$, the previous point value horizontally $v_{e_i,a_{i-1}}$ and the corresponding previous point value $\tilde{v}_{e_{i-1},a_{i-1}}$ and current point value $\tilde{v}_{e_{i-1},a_i}$ on the circularly interpolated new points (which are derived from the previous elevation level) are used as regressors to create a predictor with 3 linear prediction coefficients. One option is to use a fixed linear predictor, like $\hat{v}_{e_i,a_i}=v_{e_i,a_{i-1}}+\tilde{v}_{e_{i-1},a_i}-\tilde{v}_{e_{i-1},a_{i-1}}$, which would predict perfectly 2D linear slopes in dB domain.

The fourth sequence 40 also goes horizontally, in order for each elevation, exactly like the third sequence 30, however starting from the one next to the equator towards the South Pole 2 until the one previous to the South Pole 2. For the third and fourth sequences 30 and 40, the encoder 100 may select the best prediction mode among order 1 prediction, order 2 prediction, and special prediction, the one producing the smallest entropy of the prediction error (prediction residual).

In FIGS. 1*a*-1*f* this fourth stage can be performed by the predictor block 120 of the encoder 100, and its reverse function is performed by the predictor block 210 of the decoder 200. The fifth stage is entropy coding of the prediction residuals, using an adaptive probability estimator of its distribution and optimally coding it using a range encoder. For a small to medium degree step, i.e., 5 degrees to 15 degrees, the prediction errors (prediction residuals) for typical directivities usually have a very small alphabet range, like {−4, . . . , 4}. This very small alphabet size allows using an adaptive probability estimator directly, to match optimally the arbitrary probability distribution of the prediction error (prediction residual). For a large to very large degree step, i.e., 18 to 30 degrees, the alphabet size becomes larger, and equal bins of an odd integer size centered on zero can optionally be used to match the overall shape of the probability distribution of the prediction error, while keeping the effective alphabet size small. A value is coded in two stages, first the bin index is coded using an adaptive probability estimator, and then the position inside the bin is coded using a uniform probability distribution. The encoder can select the optimal bin size, the one providing the smallest total entropy. For example, a bin size of 3 would group values −4, −3, −2 in one bin, values −1, 0, 1 in another bin, and so on. In FIGS. 1*a*-1*c* this fifth stage can be performed by the bitstream writer 120 of the encoder 100, and its reverse function can be performed by the bitstream reader 230 of the decoder 200.

Further Embodiments

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding audio values, wherein an encoded representation of the audio values is received from a bitstream, the audio values being according to different directions, the directions being associated with discrete positions on a unit sphere, the discrete positions on the unit sphere being displaced according to parallel lines from an equatorial line towards a first pole and from the equatorial line towards a second pole, the apparatus comprising:

a bitstream reader configured to acquire prediction residual values from the encoded representation of the audio values received from the bitstream;

a prediction section configured to acquire the audio values by prediction and from the prediction residual values, the prediction section using a plurality of prediction sequences comprising:

at least one initial prediction sequence, along a line of adjacent discrete positions, predicting audio values based on the audio values of the immediately preceding audio values in the same initial prediction sequence; and at least one subsequent prediction sequence, divided among a plurality of subsequences, each subsequence moving along a parallel line and being adjacent to a previously predicted parallel line, and being such that audio values along a parallel line being processed are predicted based on at least:

audio values of the adjacent discrete positions in the same subsequence; and interpolated versions of the audio values of the previously predicted adjacent parallel line, each interpolated version of the adjacent previously predicted parallel line comprising the same number of discrete positions of the parallel line being processed;

wherein the apparatus is configured to acquire, using the audio values acquired by the prediction section, a decoded audio signal and to render the decoded audio signal.

2. The apparatus of claim 1, wherein the at least one initial prediction sequence comprises a meridian initial prediction sequence along a meridian line of the unit sphere, wherein at least one of the plurality of subsequences starts from a discrete position of the already predicted at least one meridian initial prediction sequence.

3. The apparatus of claim 2, wherein the at least one initial prediction sequence comprises an equatorial initial prediction sequence, along the equatorial line of the unit sphere, to be performed after the meridian initial prediction sequence, the equatorial initial prediction sequence starting from a discrete position of the already predicted at least one meridian initial prediction sequence.

4. The apparatus of claim 3, wherein a first subsequence of the plurality of subsequences is performed along a parallel line adjacent to the equatorial line, and the further subsequences of the plurality of subsequences are performed in a succession towards a pole.

5. The apparatus of any claim 1, wherein the prediction section is configured, in at least one initial prediction sequence, to predict at least one audio value by linear prediction from one already predicted single audio value in an adjacent discrete position.

6. The apparatus of claim 5, wherein the linear prediction is, in at least one of the prediction sequences or in at least one subsequence, an identity prediction, so that the predicted audio value is the same of the single audio value in the adjacent discrete position.

7. The apparatus of claim 1, wherein the prediction section is configured, in at least one initial prediction sequence, to predict at least one audio value by prediction from only one already predicted audio value in a first adjacent discrete position and one already predicted audio value in a second discrete position adjacent to the first adjacent discrete position.

8. The apparatus of claim 7, wherein the prediction is linear.

9. The apparatus of claim 7, wherein the prediction is so that the already predicted audio value in the first adjacent discrete position is weighted at least twice as much as the already predicted audio value in the second discrete position adjacent to the first adjacent discrete position.

10. The apparatus of claim 1, wherein the prediction section is configured, in at least one subsequence, to predict at least one audio value based on:

the immediately preceding audio value in the adjacent discrete position in the same subsequence; and at least one first interpolated audio value in an adjacent position in the interpolated version of the previously predicted parallel line.

11. The apparatus of claim 10, wherein the prediction section is configured, in at least one subsequence, to predict at least one audio value also based on:

at least one second interpolated audio value in a position adjacent to the position of the first interpolated audio value and adjacent to the adjacent discrete position in the same subsequence.

12. The apparatus of claim 11, wherein, in the interpolation, a same weight is given to:

the first interpolated audio value in the adjacent position in the interpolated version of the previously predicted parallel line; and the at least one second interpolated audio value in the position adjacent to the position of the first interpolated audio value and adjacent to the previously predicted audio value in the adjacent position in the same subsequence.

13. The apparatus of claim 1, wherein the prediction section is configured, in at least one subsequence, to predict the at least one audio value through a linear prediction.

14. The apparatus of claim 1, wherein the interpolated version of the immediately previously predicted parallel line is retrieved through a processing which reduces the number of discrete positions of the previously predicted parallel line to match the number of discrete positions in the parallel line to be predicted.

15. The apparatus of claim 1, wherein the interpolated version of the immediately previously predicted parallel line is retrieved through circular interpolation.

16. The apparatus of claim 1, configured to choose, based on signalling in the bitstream, to perform the at least one subsequent prediction sequence, by moving along the parallel line and being adjacent to a previously predicted parallel line, such that audio values along a parallel line being processed are predicted based on only audio values of the adjacent discrete positions in the same subsequence.

17. The apparatus of claim 1, wherein the prediction section comprises an adder to add the predicted values and the prediction residual values.

18. The apparatus of claim 1, configured to separate the frequency according to different frequency bands, and to perform a prediction for each frequency band.

19. The apparatus of claim 18, wherein the spatial resolution of the unit sphere is the same for higher-frequency bands and for lower-frequency bands.

20. The apparatus of claim 1, configured to select the spatial resolution of the unit sphere among a plurality of predefined spatial resolutions, based on signalling in the selected spatial resolution in the bitstream.

21. The apparatus of claim 1, configured to convert the predicted audio values in logarithmic domain.

22. The apparatus of claim 1, wherein at least some audio values are gain coefficients.

23. The apparatus of claim 22, configured to receive a signalled value determining a quantized step size for the gain coefficients.

24. The apparatus of claim 21, configured to select between a baseline mode and an optimized mode, the baseline mode adopting a coding based on using a uniform probability distribution, and the optimized mode using residual compression in conjunction with an adaptive probability estimator and/or a plurality of different prediction orders.

25. The apparatus of claim 1 wherein the audio values are directivity metadata.

26. The apparatus of claim 1, wherein the audio values are metadata.

27. The apparatus of claim 1, wherein the predicted audio values are decibel values.

28. The apparatus of claim 1 configured to recursively add each audio value to an adjacent audio value.

29. The apparatus of claim 28, wherein a non-differential audio value at a particular discrete position is obtained by subtracting the audio value at the particular discrete position from an audio value of an adjacent discrete position according to a predefined order.

30. The apparatus of claim 28, configured to perform a prediction for each frequency band, and to compose the frequencies according to different frequency bands.

31. The apparatus of claim 1, wherein the bitstream reader is configured to read the bitstream using a single-stage decoding, according to which:

more frequent predicted audio values are associated with codes with lower length than the less frequent predicted audio values.

32. An apparatus for decoding audio metadata, wherein an encoded representation of the audio metadata is received from a bitstream, the audio metadata being according to different directions, the directions being associated with discrete positions on a unit sphere, the discrete positions on the unit sphere being displaced according to parallel lines from an equatorial line towards a first pole and from the equatorial line towards a second pole, the apparatus comprising:

a bitstream reader configured to acquire prediction residual values from the encoded representation of the audio metadata received from the bitstream;

a prediction section configured to acquire the audio metadata by prediction and from prediction residual values of the audio metadata, the prediction section using a plurality of prediction sequences comprising:

at least one initial prediction sequence, along a line of adjacent discrete positions, predicting the audio metadata based on the immediately preceding audio metadata in the same initial prediction sequence; and at least one subsequent prediction sequence, divided among a plurality of subsequences, each subsequence moving along a parallel line and being adjacent to a previously predicted parallel line, and being such that audio metadata along a parallel line being processed are predicted based on at least:

audio metadata of the adjacent discrete positions in the same subsequence; and interpolated versions of the audio metadata of the previously predicted adjacent parallel line, each interpolated version of the adjacent previously predicted parallel line comprising the same number of discrete positions of the parallel line being processed;

wherein the apparatus is configured to acquire, using the audio metadata acquired by the prediction section, a decoded audio metadata signal and to render the decoded audio metadata signal.

33. The apparatus of claim 32, wherein the audio metadata are gain coefficients.

34. The apparatus of claim 32, configured to select between a baseline mode and an optimized mode, the baseline mode adopting a coding based using a uniform probability distribution, and the optimized mode using residual compression in conjunction with an adaptive probability estimator and/or a plurality of different prediction orders.

35. The apparatus of claim 32, wherein the audio metadata are directivity metadata.

36. The apparatus of claim 32, wherein the audio metadata are decibel values.

37. An audio decoding method for decoding audio values, the audio values being according to different directions, the directions being associated with discrete positions on a unit sphere, the discrete positions on the unit sphere being displaced according to parallel lines from an equatorial line towards a first pole and from the equatorial line towards a second pole, the method comprising:

receiving an encoded representation of the audio values from a bitstream;

acquiring prediction residual values from the encoded representation of the audio values received from the bitstream;

decoding the prediction residual values and predicted values from a plurality of prediction sequences comprising:

at least one initial prediction sequence, along a line of adjacent discrete positions, predicting audio values based on the audio values of the immediately preceding audio values in the same initial prediction sequence; and at least one subsequent prediction sequence, divided among a plurality of subsequences, each subsequence moving along a parallel line and being adjacent to a previously predicted parallel line, and being such that audio values along a parallel line being processed are predicted based on at least:

the audio values of the adjacent discrete positions in the same subsequence; and interpolated versions of the audio values of the adjacent previously predicted parallel line, each interpolated version of the adjacent previously predicted parallel line comprising the same number of discrete positions of the parallel line being processed, acquiring, using the decoded prediction residual values and the decoded predicted values, a decoded audio signal and rendering the decoded audio signal.

38. A non-transitory digital storage medium having a computer program stored thereon to perform the method for decoding audio values, the audio values according to different directions, the directions being associated with discrete positions on a unit sphere, the discrete positions on the unit sphere being displaced according to parallel lines from an equatorial line towards a first pole and from the equatorial line towards a second pole, the method comprising:

receiving an encoded representation of the audio values from a bitstream;

acquiring prediction residual values from the encoded representation of the audio values received from the bitstream;

decoding the prediction residual values and predicted values from a plurality of prediction sequences comprising:

at least one initial prediction sequence, along a line of adjacent discrete positions, predicting audio values based on the audio values of the immediately preceding audio values in the same initial prediction sequence; and at least one subsequent prediction sequence, divided among a plurality of subsequences, each subsequence moving along a parallel line and being adjacent to a previously predicted parallel line, and being such that audio values along a parallel line being processed are predicted based on at least:

the audio values of the adjacent discrete positions in the same subsequence; and interpolated versions of the audio values of the adjacent previously predicted parallel line, each interpolated version of the adjacent previously predicted parallel line having the same number of discrete positions of the parallel line being processed;

acquiring, using the decoded prediction residual values and the decoded predicted values, a decoded audio signal and rendering the decoded audio signal, when said computer program is run by a computer.

* * * * *